United States Patent
Xia et al.

(10) Patent No.: US 12,437,464 B2
(45) Date of Patent: Oct. 7, 2025

(54) METHOD AND APPARATUS, ELECTRONIC DEVICE, COMPUTER-READABLE STORAGE MEDIUM, AND COMPUTER PROGRAM PRODUCT FOR PERFORMING REAL-TIME IMAGE RENDERING OF VIRTUAL OBJECTS

(71) Applicant: Tencent Technology (Shenzhen) Company Limited, Shenzhen (CN)

(72) Inventors: Fei Xia, Shenzhen (CN); Fei Ling, Shenzhen (CN); Yongxiang Zhang, Shenzhen (CN); Jun Deng, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 98 days.

(21) Appl. No.: 18/369,721

(22) Filed: Sep. 18, 2023

(65) Prior Publication Data

US 2024/0005588 A1  Jan. 4, 2024

Related U.S. Application Data

(63) Continuation of application No. PCT/CN2022/136193, filed on Dec. 2, 2022.

(51) Int. Cl.
*G06T 15/04* (2011.01)
*G06T 7/90* (2017.01)
(Continued)

(52) U.S. Cl.
CPC ............ *G06T 15/04* (2013.01); *G06T 7/90* (2017.01); *G06V 10/54* (2022.01); *G06V 10/751* (2022.01)

(58) Field of Classification Search
CPC .. G06T 15/04; G06T 7/90; G06T 9/00; G06T 2219/2012; G06T 19/20; G06T 15/205;
(Continued)

(56) References Cited

U.S. PATENT DOCUMENTS 6,078,334 A * 6/2000 Hanaoka ............... G06T 15/04
                                                345/584
7,932,914 B1   4/2011 Geiss et al.
(Continued)

FOREIGN PATENT DOCUMENTS

CN    102696220 A    9/2012
CN    106033617 A   10/2016
(Continued)

OTHER PUBLICATIONS

Tencent Technology (Shenzhen) Company Limited, ISR, PCT/CN2022/136193, Feb. 22, 2023, 3 pgs.
(Continued)

*Primary Examiner* — Maurice L. McDowell, Jr.
(74) *Attorney, Agent, or Firm* — Morgan, Lewis & Bockius LLP

(57) ABSTRACT

This application provides an image rendering method performed by an electronic device. The method includes: acquiring first texture data of a virtual object and conversion parameters corresponding to second texture data of the virtual object; performing, based on the conversion parameters and the first texture data, fitting rendering to obtain a fitted rendering image comprising the virtual object; updating the conversion parameters and the first texture data based on a rendering loss between the fitted rendering image and a reference rendering image comprising the virtual object, wherein the reference rendering image is a rendering image that is obtained by performing rendering based on the second texture data; and performing, based on the updated conversion parameters and the updated first texture data, real-time rendering to obtain a target rendering image comprising the virtual object.

20 Claims, 17 Drawing Sheets

(51) Int. Cl.
*G06V 10/54* (2022.01)
*G06V 10/75* (2022.01)

(58) Field of Classification Search
CPC ........ G06T 7/41; G06V 10/54; G06V 10/751; G06V 10/56; G06V 10/761
See application file for complete search history.

(56) References Cited

U.S. PATENT DOCUMENTS

| | | | |
|---|---|---|---|
| 2016/0078667 A1* | 3/2016 | Shim | G06T 15/04 345/420 |
| 2020/0151509 A1 | 5/2020 | Sunkavalli et al. | |
| 2021/0279952 A1* | 9/2021 | Chen | G06N 3/047 |
| 2023/0140460 A1* | 5/2023 | Munkberg | G06N 3/045 345/423 |

FOREIGN PATENT DOCUMENTS

| | | |
|---|---|---|
| CN | 113963110 A | 1/2022 |
| CN | 114067042 A | 2/2022 |
| WO | WO-2022103877 A1 * | 5/2022 |

OTHER PUBLICATIONS

Tencent Technology, WO, PCT/CN2022/136193, Feb. 22, 2023, 4 pgs.
Tencent Technology, IPRP, PCT/CN2022/136193, Aug. 30, 2024, 5 pgs.
Tencent Technology, Extended European Search Report, EP Patent Application No. 22929625.6, Feb. 12, 2025, 9 pgs.
Francesco Banterle et al., "Expanding Low Dynamic Range Videos for High Dynamic Range Applications", SCCG '08: Proceedings of the 24th Spring Conference on Computer Graphics, Apr. 2008, 10 pgs.
Francesco Banterle et al., "Inverse Tone Mapping", Graphite '06: Proceedings of the 4th International Conference on Computer Graphics and Interactive Techniques in Australasia and Southeast Asia, Nov. 2006, 9 pgs.
Hanning Yu et al., "Luminance Attentive Networks for HDR Image and Panorama Reconstruction", Computer Graphics Forum, Image Synthesis and Enhancement, vol. 40, Issue 7, Sep. 2021, 21 pgs.
Jinghui Li et al., "Hornet: Single-lmage-Based HDR Reconstruction Using Channel Attention CNN", ICMSSP '19: Proceedings of the 2019 4th International Conference on Multimedia Systems and Signal Processing, May 2019, 6 pgs.
Jon Hasselgren et al., "Appearance-Driven Automatic 3D Model Simplification", Eurographics Symposium on Rendering (DL-only Track), Apr. 2021, 19 pgs.

* cited by examiner

METHOD AND APPARATUS, ELECTRONIC DEVICE, COMPUTER-READABLE STORAGE MEDIUM, AND COMPUTER PROGRAM PRODUCT FOR PERFORMING REAL-TIME IMAGE RENDERING OF VIRTUAL OBJECTS

CROSS-REFERENCE TO RELATED APPLICATIONS

This application is a continuation application of PCT Patent Application No. PCT/CN2022/136193, entitled "IMAGE RENDERING METHOD AND APPARATUS, ELECTRONIC DEVICE, COMPUTER-READABLE STORAGE MEDIUM, AND COMPUTER PROGRAM PRODUCT" filed on Dec. 2, 2022, which is based on and claims priority to Chinese Patent Application No. 202210202833.0, entitled "IMAGE RENDERING METHOD AND APPARATUS, ELECTRONIC DEVICE, COMPUTER-READABLE STORAGE MEDIUM, AND COMPUTER PROGRAM PRODUCT" filed on Mar. 3, 2022, and claims priority to the Chinese Patent, all of which is incorporated by reference in its entirety.

FIELD OF THE TECHNOLOGY

This application relates to the field of computer graphics and image technologies, and in particular, to an image rendering method and apparatus, an electronic device, a computer-readable storage medium, and a computer program product.

BACKGROUND OF THE DISCLOSURE

Graphics processing hardware-based display technology expands channels for perceiving the environment and acquiring information. In particular, display technology for virtual scenes can realize diversified interactions between virtual objects controlled by users or artificial intelligence according to actual application requirements, and has various typical application scenarios. For example, in a virtual scene of a game or the like, a real battle process of virtual objects can be simulated.

In the related technology, a high-dynamic-range texture resource is usually compressed to reduce bandwidth usage of the texture resource. However, it is difficult to achieve a good rendering effect by compressed texture resource-based rendering. There is no solution that takes into account both a rendering resource and a rendering effect in the related technology.

SUMMARY

Embodiments of this application provide an image rendering method and apparatus, an electronic device, a computer-readable storage medium, and a computer program product, which can achieve a good rendering effect by using a loss between different rendering images based on texture data with low bandwidth usage, to improve utilization of a rendering resource.

Technical solutions in the embodiments of this application are implemented as follows:

An embodiment of this application provides an image rendering method performed by an electronic device, which includes:

acquiring first texture data of a virtual object and conversion parameters corresponding to second texture data of the virtual object;

performing, based on the conversion parameters and the first texture data, fitting rendering to obtain a fitted rendering image including the virtual object;

updating the conversion parameters and the first texture data based on a rendering loss between the fitted rendering image and a reference rendering image comprising the virtual object, wherein the reference rendering image is a rendering image that is obtained by performing rendering based on the second texture data; and performing, based on the updated conversion parameters and the updated first texture data, real-time rendering to obtain a target rendering image including the virtual object.

An embodiment of this application provides an electronic device, which includes:

a memory, configured to store computer-executable instructions; and a processor, configured to cause, when executing the computer-executable instructions stored in the memory, the electronic device to implement the image rendering method according to the embodiments of this application.

An embodiment of this application provides a non-transitory computer-readable storage medium, which stores computer-executable instructions that, when executed by a processor of an electronic device, causes the electronic device to implement the image rendering method according to the embodiments of this application.

The embodiments of this application have the following beneficial effects:

Rendering is performed on the first texture data and the second texture data, respectively, the first texture data is updated based on the loss between the rendering results, and the conversion parameters involved in rendering based on the first texture data are also updated. The image information range of the second texture data is greater than that of the first texture data, and the data size of the first texture data is smaller than that of the second texture data. Therefore, when real-time image rendering is performed based on the updated first texture data and conversion parameters, a smaller storage space and fewer computing resources are consumed to achieve a rendering effect corresponding to the second texture data. Accordingly, the utilization of a rendering resource is effectively improved.

DESCRIPTION OF EMBODIMENTS

Figure 1A:
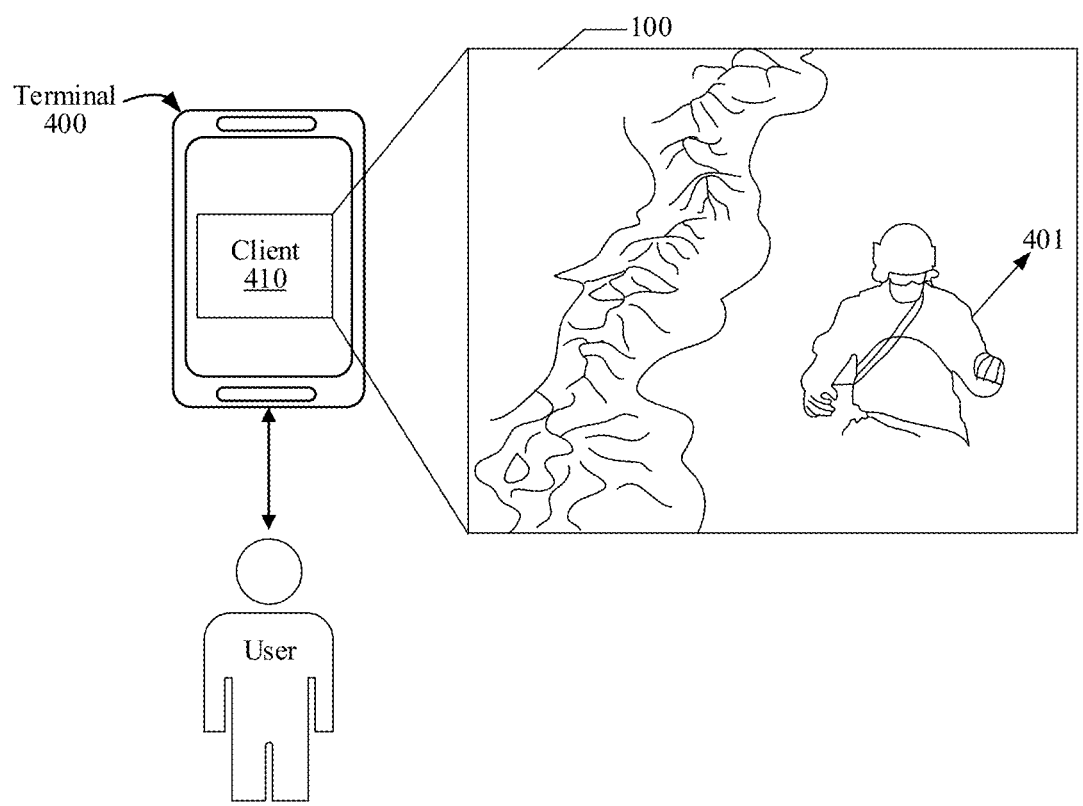
FIG. 1A and FIG. 1B are schematic diagrams of an architecture of an image rendering system according to embodiments of this application.

In order to make the objectives, technical solutions, and advantages of this application clearer, the following describes this application in further detail with reference to the accompanying drawings. The described embodiments are not to be considered as a limitation on this application. All other embodiments obtained by those of ordinary skill in the art without involving any creative effort shall fall within the scope of protection of this application.

In the following description, the terms "first/second" are merely intended to distinguish between similar objects rather than describe a specific order of the objects. It may be understood that the term "first/second" may be interchanged in a specific order or sequential order if allowed, so that the embodiments of the application described here can be implemented in an order other than those illustrated or described here.

Unless otherwise defined, all technical and scientific terms used herein have the same meaning as commonly understood by those skilled in the art to which this application belongs. The terms used herein are merely intended to describe the embodiments of this application, but are not intended to limit this application.

Before the embodiments of this application are described in further detail, a description is made on nouns and terms involved in the embodiments of this application. The nouns and terms involved in the embodiments of this application are applicable to the following explanations.

1) Client: It is an application program that runs on a terminal and that provides various services, such as a video playback client or a game client.

2) Virtual scene: It is a virtual game scene displayed (or provided) when a game application program runs on a terminal. The virtual scene may be a simulation environment of the real world, a semi-simulation and semi-fictional virtual environment, or a purely fictional virtual environment. The virtual scene may be any one of a two-dimensional virtual scene, a 2.5-dimensional virtual scene, and a three-dimensional virtual scene. A dimensionality of the virtual scene is not defined in the embodiments of this application. For example, the virtual scene may include sky, land, ocean, and the like. The land may include environmental elements such as a desert and a city. A user can control a virtual object to move in the virtual scene.

3) Virtual object: It is an image of a human or thing that can perform interactions in a virtual scene, or a movable object in a virtual scene. The movable object may be a virtual character, a virtual animal, a cartoon character, or the like, for example, may be a character or animal displayed in a virtual scene. The virtual object may be a virtual image representing a user in a virtual scene. There may be a plurality of virtual objects in a virtual scene, and each virtual object has its own shape and volume in the virtual scene and occupies a partial space in the virtual scene.

4) Image rendering: It is a process of converting three-dimensional radiosity into a two-dimensional image. A scene and an object are represented in three-dimensional forms, so they are closer to the real world and are easy to operate and change. Most image display devices are two-dimensional raster displays and dot matrix printers. Conversion of a representation of a three-dimensional scene into a representation of N-dimensional rasters and a dot matrix is image rendering, that is, rasterization. A raster display may be taken as a pixel matrix, and any image displayed on the raster display is actually a set of pixels with one or more colors and grayscales.

5) Tone mapping: Its function is to map a high-dynamic-range (HDR) color to a low-dynamic-range (LDR) color, so that a display can display the color properly. The function of a dynamic range space conversion function (inverse tone mapping) corresponding to tone mapping is to map an LDR color to an HDR color, to restore a color of an original brightness range.

6) High dynamic range (HDR): an HDR image can show a greater dynamic range (for example, a width of a dynamic range is greater than a width threshold) and higher level of detail (for example, a level of detail is greater than a threshold of the level of detail) compared to an ordinary image. Based on LDR images with different exposure times, a final HDR image is synthesized using an LDR image with the best detail that corresponds to each exposure time, which can better reflect the visual effect of people in the real environment.

7) Low dynamic range (LDR): A dynamic range with a width not greater than a width threshold and a level of detail not higher than a threshold of the level of detail is referred to as an LDR, which will cause loss of detail in highlights or shadows. In photography, a dynamic range is measured based on a difference between exposure values.

High-dynamic-rang rendering (HDRR) and high-dynamic-range texture (HDRT) are important technologies in game real-time rendering. An HDRT is a texture map with an HDR. A rendering effect achieved by the combination of HDRR and HDRT is greatly higher than that achieved by the combination of low-dynamic-range rendering (LDRR) and low-dynamic-range texture (LDRT). An LDRT is a texture map with an LDR. In a case of a great light brightness range or a significant brightness difference between different regions in a game, a difference between rendering effects is significant. During implementation of the embodiments of this application, the applicant has found that although the combination of HDRR and HDRT can achieve a more realistic rendering effect, the combination of HDRR and HDRT requires a higher rendering cost. For example, in an uncompressed HDRT, each channel requires 32 bits, so each pixel (including 3 channels) requires 96 bits. However, in an uncompressed LDRT, each channel requires 8 bits, which will be less after compression. During implementation of the embodiments of this application, the applicant has found that HDRR and HDRT will not only bring the burden of package body occupancy and memory usage to a game, but also bring more bandwidth overhead and computation burden during rendering. Therefore, for various games, especially mobile games with fewer resources, an HDRT will be compressed and computation optimization will be performed on HDRR, to reduce package body occupancy and bandwidth usage caused by the HDRT as much as possible, reduce computation consumption of HDRR, and approximate the rendering effect achieved by the original HDRT and HDRR as far as possible.

In the related technology, a method for compressing an HDRT into an LDRT is provided. According to the method, a difference between an LDRT and an HDRT in a texture map space is calculated, conversion parameters of a tone mapping function for minimizing the difference are obtained by using the Levenberg-Marquadt algorithm, and the HDRT is converted, based on the conversion parameters, into the LDRT for packaging and encapsulation. During implementation of the embodiments of this application, the applicant has found that in the related technology, only the texture difference in the texture map space is considered. However, for rendering, a difference between rendering results shall be considered. In this way, an obtained result will be more accurate.

Embodiments of this application provide an image rendering method and apparatus, an electronic device, a non-transitory computer-readable storage medium, and a computer program product, which can achieve a good rendering effect by using a loss between different rendering images based on texture data with low bandwidth usage, to improve utilization of a rendering resource. In order to understand the image rendering method according to the embodiments of this application more easily, an exemplary implementation scenario of the image rendering method according to the embodiments of this application is described first. A virtual object in the image rendering method according to the embodiments of this application may be completely outputted based on a terminal, or collaboratively outputted based on a terminal and a server.

In some embodiments, a virtual scene may be an environment for interactions between game characters. For example, the game characters may fight in the virtual scene, or the game characters may be controlled to interact in the virtual scene, so that users can relieve the pressure of life during a game.

In an implementation scenario, referring to FIG. 1A, FIG. 1A is a schematic diagram of an architecture of an image rendering system according to an embodiment of this application, which is applicable to some application modes that completely rely on the computing power of graphics processing hardware of a terminal 400 to complete computation of data related to a virtual scene 100, such as a stand-alone/offline mode game. The virtual scene is outputted by different types of terminals 400, such as a smartphone, a tablet computer, and a virtual reality/augmented reality device.

For example, types of graphics processing hardware include a central processing unit (CPU) and a graphics processing unit (GPU).

During formation of a visual perception of the virtual scene 100, the terminal 400 computes display data through the graphics computing hardware, completes loading, parsing, and rendering of the display data, and outputs a video frame capable of forming the visual perception of the virtual scene through graphics output hardware. For example, a two-dimensional video frame is displayed on a display screen of a smartphone, or a video frame capable of achieving a three-dimensional display effect is projected on lenses of augmented reality/virtual reality glasses. In addition, in order to enrich the perception effect, the terminal 400 may form one or more of an auditory perception, a tactile perception, a motion perception, and a taste perception through different hardware.

For example, a client 410 (such as a stand-alone game application) runs on the terminal 400, and a virtual scene including characters is outputted during operation of the client 410. The virtual scene may be an environment for interactions between game characters, such as a plain, a street, a valley or the like for a battle between the game characters. An example in which the virtual scene 100 is displayed from a first-person perspective is used for description. A virtual object 401 is displayed in the virtual scene 100. The virtual object 401 may be a game character controlled by a user (or referred to as a player), and moves in the virtual scene in response to an operation of the real user for a button (including a joystick button, an attack button, a defense button, and the like). For example, when the real user moves the joystick button to the left, the virtual object will move to the left in the virtual scene. The virtual object can further stay still, jump, and use various functions (such as skills and props). The virtual object 401 may also be artificial intelligence (AI) set in a battle in the virtual scene by training. The virtual object 401 may further be a non-player character (NPC) set in an interaction in the virtual scene. The virtual object 401 may further be an immovable object or a movable object in the virtual scene 100.

For example, the terminal 400 may be a terminal used by a game developer. In the development and packaging stage of a game, the terminal 400 acquires first texture data of the virtual object 401 and conversion parameters corresponding to second texture data of the virtual object. A data size of the first texture data is smaller than a data size of the second texture data, and an image information range of the first texture data is smaller than an image information range of the second texture data. Fitting rendering is performed based on the conversion parameters and the first texture data to obtain a fitted rendering image including the virtual object. A rendering loss between the fitted rendering image and a standard rendering image is determined, and the conversion parameters and the first texture data are updated based on the rendering loss. The standard rendering image is a rendering image that is obtained by performing standard rendering based on the second texture data and that includes the virtual object. The foregoing processing is performed before a game is started. In the test stage, that is, during installation and operation of the game, the terminal 400 performs, based on the updated conversion parameters and the updated first texture data, real-time rendering to obtain a target rendering image including the virtual object, and performs human-computer interaction, such as a game battle, in a virtual scene based on the target rendering image.

Figure 1B:
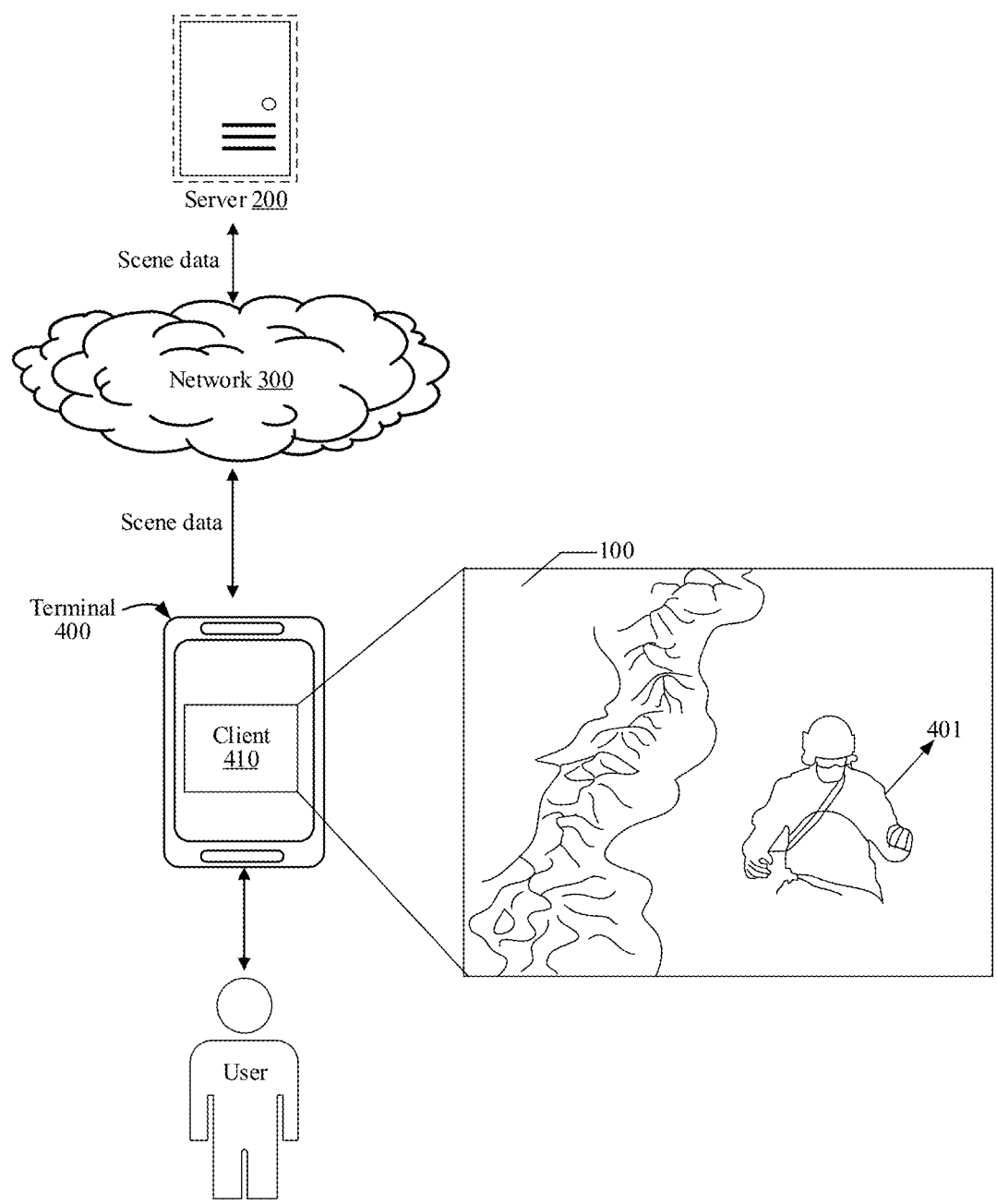

In another implementation scenario, referring to FIG. 1B, FIG. 1B is a schematic diagram of an architecture of an image rendering system according to an embodiment of this application, which is applied to a terminal 400 and a server 200, and applicable to an application mode that relies on the computing power of the server 200 to complete computation of a virtual scene and outputs the virtual scene through the terminal 400.

An example in which a visual perception of a virtual scene 100 is formed is used for description. The server 200 performs computation of display data (such as scene data) related to the virtual scene and transmits the display data to the terminal 400 through a network 300. The terminal 400 completes loading, parsing, and rendering of the display data through graphics computing hardware, and outputs the virtual scene through graphics output hardware to form the visual perception. For example, a two-dimensional video frame may be displayed on a display screen of a smartphone, or a video frame capable of achieving a three-dimensional display effect is projected on lenses of augmented reality/virtual reality glasses. It may be understood that a perception of the form of a virtual scene may be outputted through corresponding hardware of the terminal 400. For example, an auditory perception may be formed by using a microphone, or a tactile perception may be formed by using a vibrator.

For example, a client 410 (such as a web game application) runs on the terminal 400, and is connected to the server 200 (such as a game server) to perform game interaction with another user. The terminal 400 outputs the virtual scene 100 of the client 410. An example in which the virtual scene 100 is displayed from a first-person perspective is used for description. A virtual object 401 is displayed in the virtual scene 100. The virtual object 401 may be a game character controlled by a user (or referred to as a player), and moves in the virtual scene in response to an operation of the real user for a button (including a joystick button, an attack button, a defense button, and the like). For example, when the real user moves the joystick button to the left, the virtual object will move to the left in the virtual scene. The virtual object can further stay still, jump, and use various functions (such as skills and props). The virtual object 401 may also be artificial intelligence (AI) set in a battle in the virtual scene by training. The virtual object 401 may further be a non-player character (NPC) set in an interaction in the virtual scene. The virtual object 401 may further be an immovable object or a movable object in the virtual scene 100.

For example, the server 200 acquires first texture data of the virtual object 401 and conversion parameters corresponding to second texture data of the virtual object. A data size of the first texture data is smaller than a data size of the second texture data, and an image information range of the first texture data is smaller than an image information range of the second texture data. Fitting rendering is performed based on the conversion parameters and the first texture data to obtain a fitted rendering image including the virtual object. A rendering loss between the fitted rendering image and a standard rendering image is determined, and the conversion parameters and the first texture data are updated based on the rendering loss. The standard rendering image is a rendering image that is obtained by performing standard rendering based on the second texture data and that includes the virtual object. The foregoing processing is performed before a game is started. For example, in the development and packaging stage of the game, the terminal 400 receives the updated first texture data and the updated conversion parameters (may be packaged in an installation package) that are transmitted by the server 200. During installation and operation of the game, the terminal 400 performs, based on the updated conversion parameters and the updated first texture data, real-time rendering to obtain a target rendering image including the virtual object, and performs human-computer interaction, such as a game battle, in a virtual scene based on the target rendering image.

In some embodiments, the terminal 400 may implement the image rendering method according to the embodiments of this application by running a computer program. For example, the computer program may be a native application or software module in an operating system, or may be a native application (APP), that is, a program that needs to be installed in the operating system to run, such as a dress up game APP (that is, the foregoing client 410), or may be an applet, that is, a program that only needs to be downloaded into a browser environment to run, or may be a game applet that can be embedded in any APP. In a word, the foregoing computer program may be any form of application program, module or plug-in.

An example in which the computer program is an application program is used for description. In practice, the application program supporting a virtual scene is installed and run on the terminal 400. The application program may be any one of a first-person shooting game, a third-person shooting game, a virtual reality application program, a three-dimensional map program, and a multiplayer shooting survival game. A user operates a virtual object in the virtual scene to move by using the terminal 400. The movement includes, but is not limited to, at least one of adjustment of a body posture, crawling, walking, running, riding, jumping, driving, picking up, shooting, attacking, throwing, and construction of a virtual building. Exemplarily, the virtual object may be a virtual character, such as a simulated character or a cartoon character.

In some embodiments, the embodiments of this application may further be implemented by cloud technology. Cloud technology is a hosting technology that unifies a series of resources, such as hardware, software, and networks, in a wide area network or a local area network to realize computation, storage, processing, and sharing of data.

Cloud technology is a general term for network technology, information technology, integration technology, management platform technology, and application technology based on cloud computing business model applications. It can form a resource pool and be used as required, which is flexible and convenient. Cloud computing technology will become an important support. Backend services of a technological network system require a large number of computing and storage resources.

Exemplarily, the server 200 in FIG. 1B may be an independent physical server, or may be a server cluster or distributed system composed of a plurality of physical servers, or may be a cloud server providing basic cloud computing services such as a cloud server, a cloud database, cloud computing, a cloud function, cloud storage, a network service, cloud communication, a middleware service, a domain name service, a security service, a content delivery network (CDN), and a big data and artificial intelligence platform. The terminal 400 may be a smartphone, a tablet computer, a notebook computer, a desktop computer, a smart speaker, a smartwatch or the like, but is not limited thereto. The terminal and the server may be connected directly or indirectly in a wired or wireless communication manner, which is not defined in the embodiments of this application.

Figure 2:
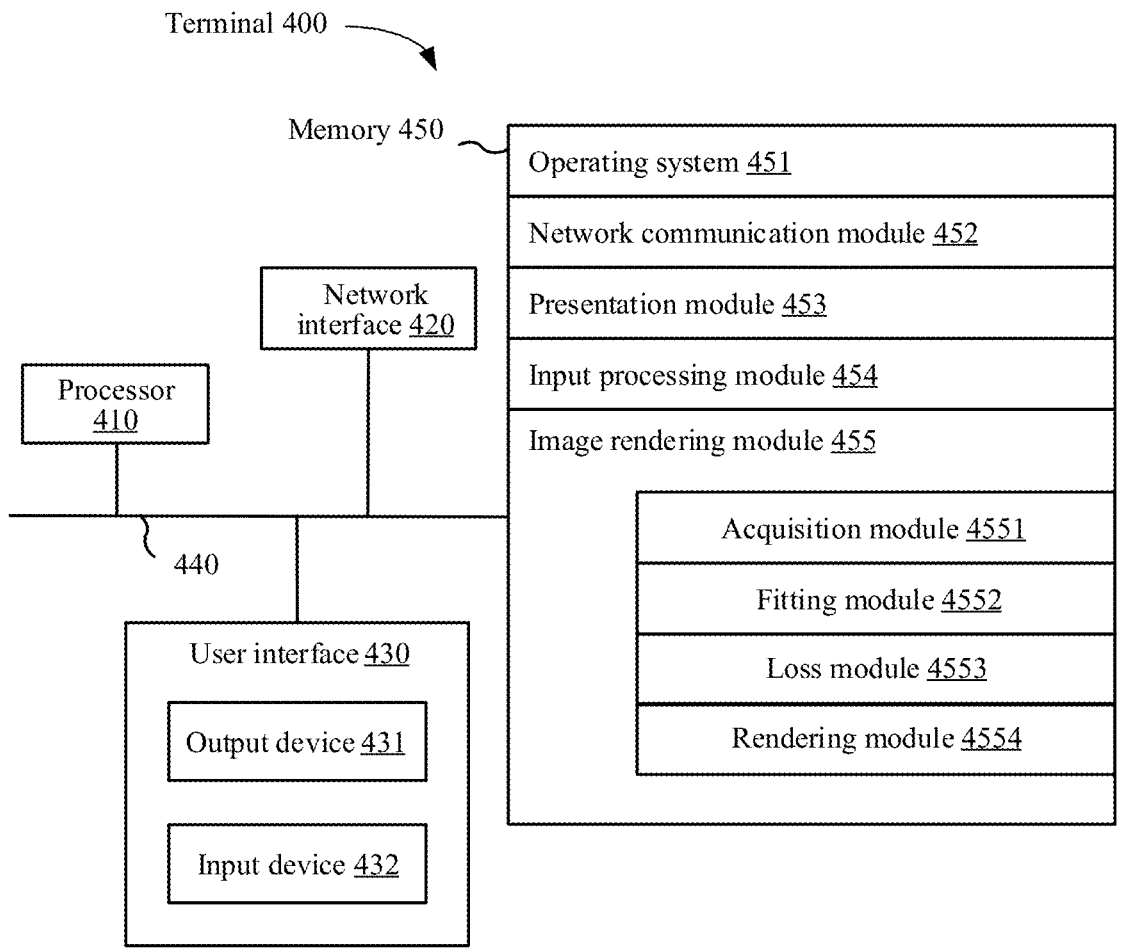
FIG. 2 is a schematic structural diagram of an electronic device for image rendering according to an embodiment of this application.

Referring to FIG. 2, FIG. 2 is a schematic structural diagram of an electronic device for image rendering according to an embodiment of this application. A terminal 400 shown in FIG. 2 includes: at least one processor 410, a memory 450, at least one network interface 420, and a user interface 430. The components in the terminal 400 are coupled together through a bus system 440. It may be understood that the bus system 440 is configured to implement connection and communication between the components. In addition to a data bus, the bus system 440 further includes a power bus, a control bus, and a state signal bus. For ease of clear description, all types of buses in FIG. 2 are marked as the bus system 440.

The processor 410 may be an integrated circuit chip capable of processing signals, such as a general-purpose processor, a digital signal processor (DSP), another programmable logic device, a discrete gate or transistor logic device, or a discrete hardware assembly. The general-purpose processor may be a microprocessor, any conventional processor or the like.

The user interface 430 includes one or more output devices 431 capable of displaying media content, for example, includes one or more speakers and/or one or more visual display screens. The user interface 430 further includes one or more input devices 432, for example, includes a user interface component assisting a user in inputting, such as a keyboard, a mouse, a microphone, a touch screen display, a camera, or another input button or control.

The memory 450 may be a removable memory, a non-removable memory, or a combination of a removable memory and a non-removable memory. Exemplarily, the hardware device includes a solid state memory, a hard disk drive, an optical disc drive, and the like. Optionally, the memory 450 includes one or more storage devices located physically away from the processor 410

The memory 450 includes a volatile memory or a non-volatile memory, or may include both a volatile memory and a non-volatile memory. The non-volatile memory may be a read-only memory (ROM), and the volatile memory may be a random-access memory (RAM). The memory 450 described in the embodiments of this application aims to include any suitable type of memory.

In some embodiments, the memory 450 can store data to support various operations. Exemplarily, the data includes a program, a module, a data structure, or a subset or superset thereof, which will be exemplarily described.

An operating system 451 includes system programs for processing various basic system services and executing hardware-related tasks, such as, a framework layer, a core library layer, and a driver layer, which are used for implementing various basic services and processing hardware-based tasks.

A network communication module 452 is configured to access to another electronic device through one or more (wired or wireless) network interfaces 420. Exemplarily, the network interface 420 includes: Bluetooth, Wireless Fidelity (WiFi), a Universal Serial Bus (USB), and the like.

A display module 453 is configured to display information through one or more output devices 431 (such as a display screen and a speaker) associated with the user interface 430 (such as a user interface configured to operate a peripheral device and display content and information).

An input processing module 454 is configured to detect one or more user inputs or interactions of one of one or more input devices 432 and translate the detected input or interaction.

In some embodiments, an image rendering apparatus according to the embodiments of this application may be implemented as software. FIG. 2 shows an image rendering apparatus 455 stored in the memory 450. The image rendering apparatus 455 may be software in the form of a program or plug-in, and include the following software modules: an acquisition module 4551, a fitting module 4552, a loss module 4553, and a rendering module 4554. These modules are logic modules. Therefore, these modules can be arbitrarily combined or further divided according to functions realized. The functions of the modules will be described below.

The following specifically describes the image rendering method according to the embodiments of this application with reference to the accompanying drawings. The image rendering method according to the embodiments of this application may be performed by the terminal 400 in FIG. 1A alone, or may be performed collaboratively by the terminal 400 and the server 200 in FIG. 1B.

Figure 3A:
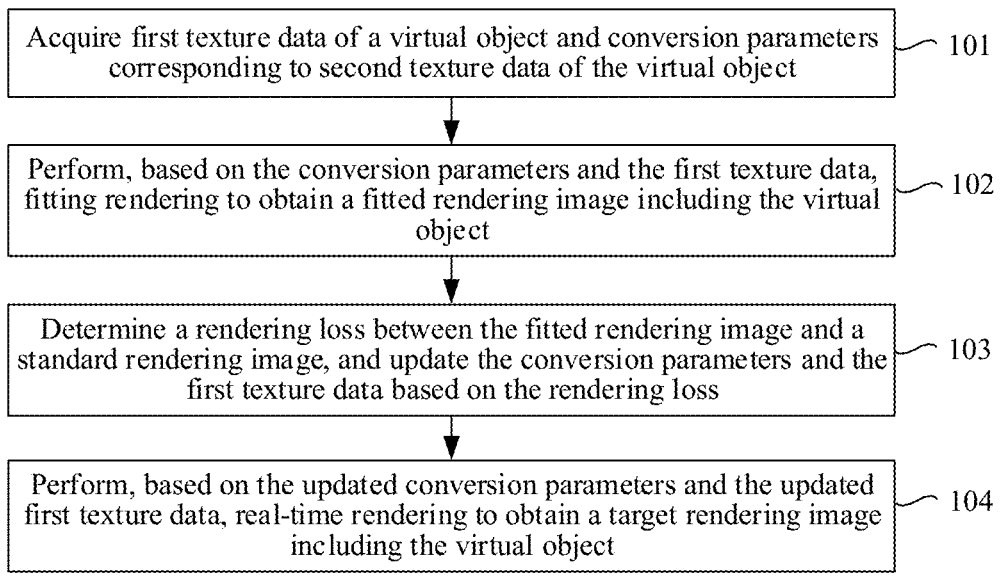
FIG. 3A to FIG. 3C are schematic flowcharts of an image rendering method according to embodiments of this application.

Next, an example in which the image rendering method according to the embodiments of this application is performed by the terminal 400 in FIG. 1A alone is used for description. Referring to FIG. 3A, FIG. 3A is a schematic flowchart of an image rendering method according to an embodiment of this application. The image rendering method is described with reference to step 101 to step 104 shown in FIG. 3A.

The method shown in FIG. 3A may be performed by the terminal 400 by running various forms of computer programs, which are not limited to the foregoing client 410, and may be the foregoing operating system 451, a software module or a script. Therefore, the client shall not be regarded as a limitation on the embodiments of this application.

Step 101: Acquire first texture data of a virtual object and conversion parameters corresponding to second texture data of the virtual object.

For example, the conversion parameters refer to parameters involved during rendering based on the second texture data. Before rendering, the virtual object is in a to-be-rendered state. The virtual object in the to-be-rendered state is taken as a basic object model. The basic object model includes the body of the virtual object, and does not include presentation information for decorating the virtual object. For example, the presentation information includes makeup (such as a lip shape, eyeshadow, pupils, iris, and blush) for modifying the face of the virtual object, and clothes (such as ancient costume and combat suits) for modifying the limbs of the virtual object.

For example, the first texture data may be an LDRT, and the second texture data may be an HDRT. The LDRT includes a first color value of each texture pixel, and the HDRT includes a second color value of each texture pixel. A data size of the first texture data is smaller than a data size of the second texture data. In an HDRT, each channel requires 32 bits, so each pixel (including 3 channels)

requires 96 bits. However, in an LDRT, each channel requires 8 bits, so each pixel (including 3 channels) requires 24 bits. An image information range of the first texture data is smaller than an image information range of the second texture data. An image information range includes a dynamic range. A dynamic range is a ratio of the highest brightness to the lowest brightness. A dynamic range of an HDRT is greater than a dynamic range of an LDRT.

For example, the first texture data may be pixel parameters of each pixel in an initialized texture image, which include a material parameter and a texture parameter. The first texture data may further be obtained by a $(n-1)^{th}$ iteration during iteration, so that the first texture data obtained by the $(n-1)^{th}$ iteration is taken as an input of an $n^{th}$ iteration. N is an integer greater than 1. Step 102 and step 103 need to be performed in each iteration.

When the first texture data is pixel parameters of each pixel in an initialized texture image, before step 101, initialization of a rendering scene needs to be performed, which includes loading of a model (the basic object model), a texture, a material, and the like. Then, a position and an orientation of a camera are set, a position and an orientation of the model are set, and parameters of various lights are set.

Step 102: Perform, based on the conversion parameters and the first texture data, fitting rendering to obtain a fitted rendering image including the virtual object.

In some embodiments, fitting rendering is performed on the virtual object. Based on the conversion parameters and the first texture data, fitting rendering is performed on the virtual object to obtain the fitted rendering image including the virtual object.

During actual operation of a game, a virtual object is not always in the same orientation. Therefore, rendering effects of the virtual object in various orientations need to be fitted, to ensure the rendering effects of the virtual object in various orientations. The acquired first texture data is taken as a resource, fitting rendering is performed on the first texture data by an unlit rendering method to obtain the fitted rendering image including the virtual object.

Figure 3B:
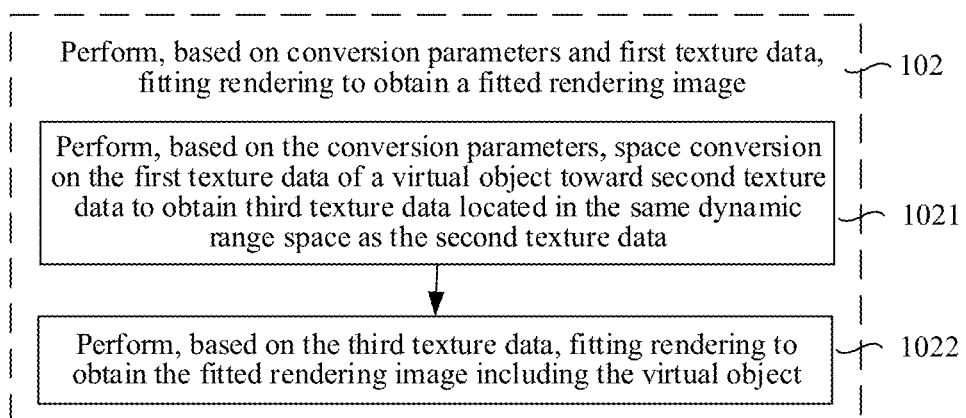

In some embodiments, referring to FIG. 3B, FIG. 3B is a schematic flowchart of an image rendering method according to an embodiment of this application, and step 102 of "perform, based on the conversion parameters and the first texture data, fitting rendering to obtain a fitted rendering image including the virtual object" may be implemented by step 1021 and step 1022 in FIG. 3B.

Step 1021: Perform, based on the conversion parameters, space conversion on the first texture data toward the second texture data to obtain third texture data located in the same dynamic range space as the second texture data.

In some embodiments, the first texture data includes a first color value of each texture pixel, the second texture data includes a second color value of each texture pixel, and the conversion parameters include a first first-order parameter and a second first-order parameter. Step 1021 of "perform, based on the conversion parameters, space conversion on the first texture data of the virtual object toward the second texture data to obtain third texture data located in the same dynamic range space as the second texture data" may be implemented by the following technical solutions: the following processing is performed on each texture pixel in the first texture data: a first product of the first color value of the texture pixel and the first first-order parameter is determined; a first sum of the first product and the second first-order parameter is determined; a ratio of the first color value of the texture pixel to the first sum is determined to be a third color value, located in the same dynamic range space as the second color value, of the texture pixel; and third color values of a plurality of texture pixels are combined into the third texture data. By space conversion, the first texture data can be mapped to a dynamic range space corresponding to the second texture data, so that a wider brightness range can be obtained. Therefore, a better rendering effect can be achieved.

For example, space conversion is implemented by using a first-order HDR space conversion function. The first-order HDR space conversion function refers to formula (1):

$$c_H = \frac{c_L}{pc_L + q}, \quad (1)$$

where, p, q are parameters of a first-order tone mapping function that need to be fitted, p is the first first-order parameter, q is the second first-order parameter, different p, q correspond to different curves, $c_H$ is the third color value, and $c_L$ is the first color value. FIG. 6D shows different curves corresponding to different p, q, an abscissa of the curve is the first color value, and an ordinate of the curve is the third color value.

In some embodiments, the first texture data includes a first color value of each texture pixel, the second texture data includes a second color value of each texture pixel, and the conversion parameters include a first second-order parameter, a second second-order parameter, a third second-order parameter, a fourth second-order parameter, and a fifth second-order parameter. Step 1021 of "perform, based on the conversion parameters, space conversion on the first texture data of the virtual object toward the second texture data to obtain third texture data" may be implemented by the following technical solutions: the following processing is performed on each texture pixel in the first texture data: a second product of a square of the first color value of the texture pixel and the first second-order parameter, and a third product of the first color value of the texture pixel and the second second-order parameter are determined; summation is performed on the second product, the third product, and the third second-order parameter to obtain a second sum; a fourth product of the first color value of the texture pixel and the fourth second-order parameter is determined; summation is performed on a square root of the second sum, the fourth product, and a square root of the third second-order parameter to obtain a third sum; a fourth sum of the first color value of the texture pixel and the fifth second-order parameter is determined; a ratio of the third sum to the fourth sum is determined to be a third color value, located in the same dynamic range space as the second color value, of the texture pixel; and third color values of a plurality of texture pixels are combined into the third texture data. By space conversion, the first texture data can be mapped to a dynamic range space corresponding to the second texture data, so that a wider brightness range can be obtained. Therefore, a better rendering effect can be achieved.

For example, space conversion is implemented by using a second-order HDR space conversion function. The second-order HDR space conversion function refers to formula (2):

$$c_H = \frac{-\sqrt{pc_L^2 + qc_L + r} + sc_L + \sqrt{r}}{c_L + t}, \quad (2)$$

where, p, q, r, s, t are parameters of the second-order HDR space conversion function that need to be fitted, p is the first second-order parameter, q is the second second-order parameter, r is the third second-order parameter, s is the fourth second-order parameter, t is the fifth second-order parameter, different combinations of p, q, r, s, t correspond to different curves, $c_H$ is the third color value, and $c_L$ is the first color value. FIG. 6E shows different curves corresponding to different combinations of p, q, r, s, t, an abscissa of the curve is the first color value, and an ordinate of the curve is the third color value.

Step 1022: Perform, based on the third texture data, fitting rendering to obtain the fitted rendering image including the virtual object.

In some embodiments, the third texture data includes a third color value of each texture pixel. Step 1022 of "perform, based on the third texture data, fitting rendering to obtain the fitted rendering image including the virtual object" may be implemented by the following technical solutions: two-dimensional texture coordinates of the virtual object are acquired; a differentiable rendering framework corresponding to fitting rendering is acquired; and perform forward propagation on the two-dimensional texture coordinates and the third color value of each texture pixel in the differentiable rendering framework to obtain the fitted rendering image including the virtual object. The differentiable rendering framework is obtained by encapsulating a hardware-based rendering process as software. The hardware-based rendering process may be an unlit rendering method. Due to encapsulating as software, the hardware-based rendering process is differentiable and derivable. Therefore, back propagation can be performed based on a gradient subsequently.

Figure 8:
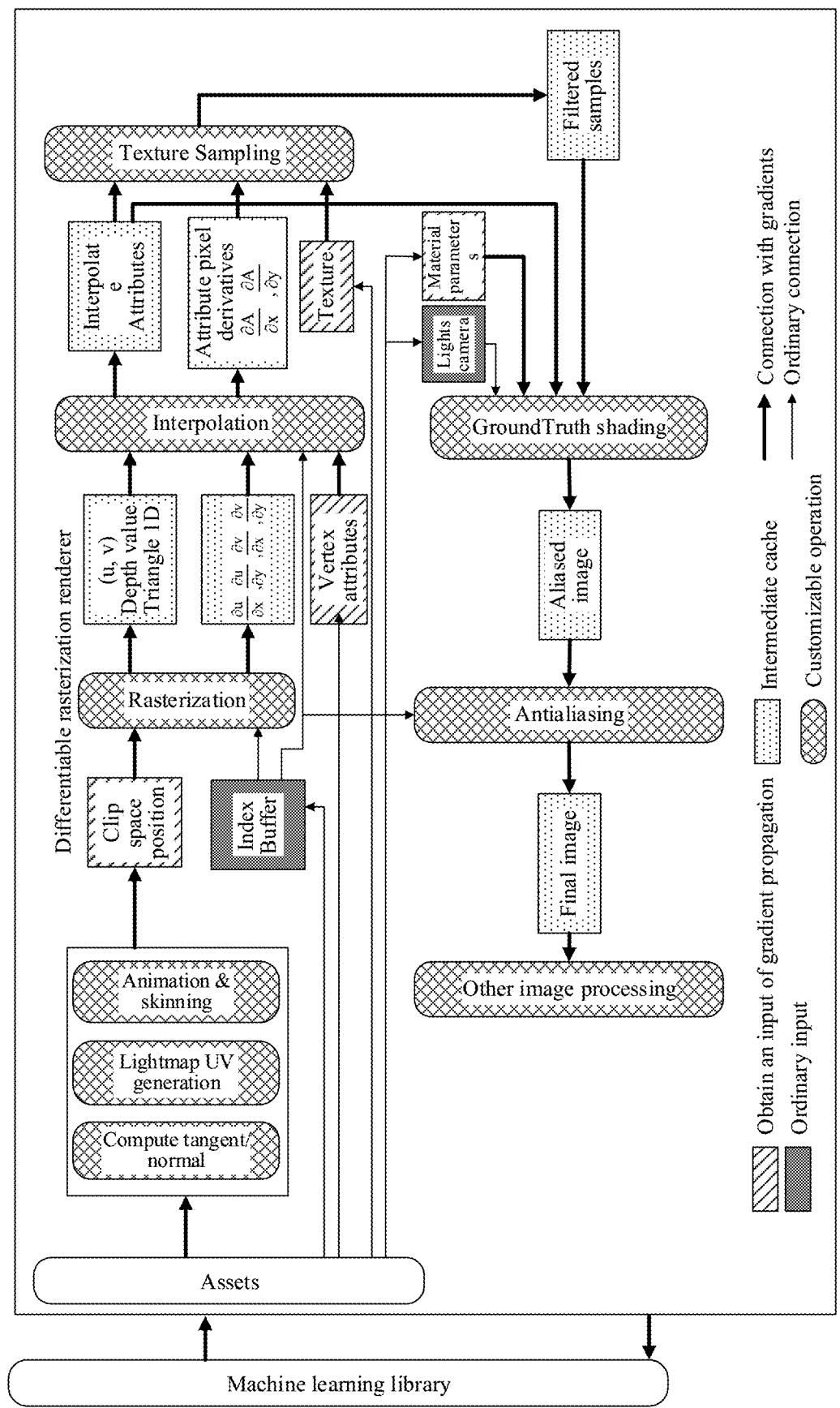
FIG. 8 is a schematic flowchart of rasterization rendering in an image rendering method according to an embodiment of this application.

For example, the two-dimensional texture coordinates of the virtual object are acquired. The two-dimensional texture coordinates are given in advance or automatically generated. The two-dimensional texture coordinates may be UV2 coordinates. All image files are two-dimensional planes. The horizontal direction is U, and the vertical direction is V. Any pixel in an image can be positioned through the two-dimensional plane. UV2 coordinates define position information of each point in an image. These points are associated with a model, to determine a position of a surface texture map. According to UV coordinates, each point in an image accurately corresponds to the surface of a model object. The differentiable rendering framework corresponding to fitting rendering is acquired, and forward propagation is performed on the two-dimensional texture coordinates and the third color value of each texture pixel in the differentiable rendering framework to obtain the fitted rendering image including the virtual object. Data involved in forward propagation further includes rendering resources such as a material and lighting. Referring to FIG. 8, FIG. 8 is a schematic flowchart of rasterization rendering according to an embodiment of this application. A whole modified rasterization rendering process is implemented by using the Compute Unified Device Architecture (CUDA), and is operated as a module of a Machine Learning Library (such as PyTorch). Here, CUDA is the foregoing differentiable rendering framework. The whole rendering process can back-propagate a gradient, so the whole process is differentiable. All relevant assets are subjected to connection with gradients to obtain a compute tangent/normal, generate lightmap UV coordinates, and compute animation and skin. The compute tangent/normal, the lightmap UV coordinates, the animation and skin are subjected to connection with gradients to obtain a clip space position. All the relevant assets are subjected to ordinary connection to obtain triangle index buffers. Rasterization is performed based on the clip space position and the triangle index buffers to obtain coordinates (u, v), $\partial u/\partial x'$ $\partial u/\partial y'$ $\partial v/\partial x'$ and $\partial v/\partial y'$ respectively. Interpolation is performed based on the coordinates (u, v), $\partial u/\partial x'$ $\partial u/\partial y'$ $\partial v/\partial x'$ $\partial v/\partial y=$ and vertex attributes to obtain interpolated attributes and attribute pixel derivatives. Texture sampling is performed based on the interpolated attributes, attribute pixel derivatives, and a texture to obtain filtered samples. To-be-fitted GroundTruth Shading is performed based on lights camera, material parameters, the interpolated attributes, and filtered samples to obtain an aliased image. Antialiasing is performed on the aliased image to obtain a final image.

Step 103: Determine a rendering loss between the fitted rendering image and a standard rendering image, and update the conversion parameters and the first texture data based on the rendering loss.

For example, an orientation of the virtual object in the standard rendering image is the same as an orientation set during fitting rendering in the iteration process. The standard rendering image is a rendering image that is obtained by performing standard rendering based on the second texture data and that includes the virtual object. Standard rendering may be physically based rendering. Specifically, physically based rendering corresponding to the virtual object is performed based on the second texture data of the virtual object to obtain the standard rendering image. For example, the second texture data of the virtual object is loaded by physically based rendering (PBR), and rendered based on physical laws to obtain the standard rendering image that conforms to the physical laws. The rendering method may achieve an optimal rendering effect, at a great cost of storage resources and computing resources.

Figure 3C:
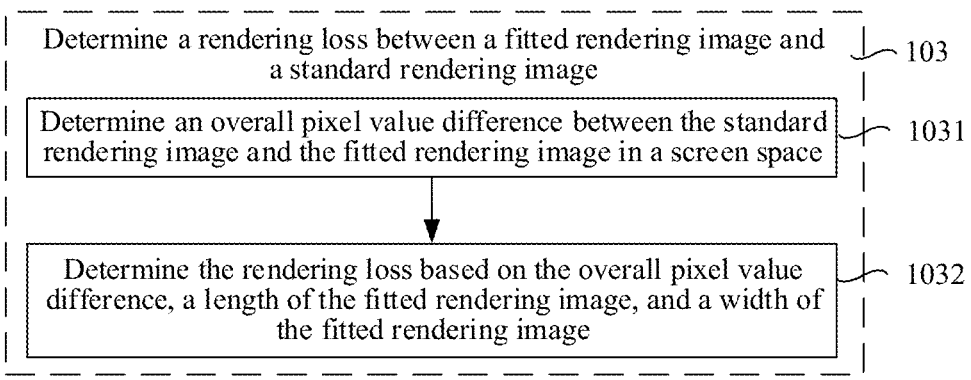

In some embodiment, referring to FIG. 3C, FIG. 3C is a schematic flowchart of an image rendering method according to an embodiment of this application, and step 103 of "determine a rendering loss between the fitted rendering image and a standard rendering image" may be implemented by step 1031 and step 1032 in FIG. 3C.

Step 1031: Determine an overall pixel value difference between the standard rendering image and the fitted rendering image in a screen space.

In some embodiments, step 1031 of "determine an overall pixel value difference between the standard rendering image and the fitted rendering image in a screen space" may be implemented by the following technical solutions: the following processing is performed on any identical pixel of the fitted rendering image and the standard rendering image in the screen space: a first pixel value corresponding to the pixel in the fitted rendering image is determined, and a second pixel value corresponding to the pixel in the standard rendering image is determined; an absolute value of a difference between the first pixel value and the second pixel value is taken as a pixel value difference corresponding to the pixel; and summation is performed on pixel value differences corresponding to a plurality of pixels to obtain the overall pixel value difference. Each pixel is taken as a minimum unit to measure the difference, so that the value of the rendering loss can be effectively increased. Therefore, during updating based on the rendering loss, the conversion parameters and the first texture data that can achieve a better rendering effect can be obtained.

In some embodiments, the following processing is performed on each identical pixel of the fitted rending image and the standard rendering image in the screen space: a first pixel value corresponding to the pixel in the fitted rendering image is determined, and a second pixel value corresponding to the pixel in the standard rendering image is determined; an absolute value of a difference between the first pixel value and the second pixel value is taken as a pixel value difference corresponding to the pixel; and summation is performed on pixel value differences corresponding to a plurality of pixels to obtain the overall pixel value difference.

Step 1032: Determine the rendering loss based on the overall pixel value difference, a length of the fitted rendering image, and a width of the fitted rendering image.

For example, the rendering loss is obtained by using formula (3):

$$L1(Img1, Img2) = \frac{1}{HW}\sum_{i=1}^{H}\sum_{j=1}^{W}|Img1_{i,j} - Img2_{i,j}|, \quad (3)$$

where, Img1 and Img2 respectively represent the standard rendering image and the fitted rendering image, H and W respectively represent the length and the width of Img1 (or Img2), $\sum_{i=1}^{H}\sum_{j=1}^{W}|Img1_{i,j}-Img2_{i,j}|$ represents the pixel value difference between the standard rendering image and the fitted rendering image in the screen space, and (i, j) represents any pixel in the standard rendering image in the screen space.

In the embodiments of this application, the method for determining the rendering loss is not limited to formula (3), and may further be another transformation formula.

In some embodiments, step 103 of "update the conversion parameters and the first texture data based on the rendering loss" may be implemented by the following technical solutions: partial derivative processing is performed, based on the rendering loss, on the first texture data to obtain a gradient corresponding to the first texture data; partial derivative processing is performed, based on the rendering loss, on the conversion parameters to obtain a gradient corresponding to the conversion parameters; and the first texture data is updated based on the gradient corresponding to the first texture data, and the conversion parameters are updated based on the gradient corresponding to the conversion parameters.

In some embodiments, that the first texture data is updated based on the gradient corresponding to the first texture data may be implemented by the following technical solutions: a set learning rate is multiplied by the gradient corresponding to the first texture data to obtain a data change value of the first texture data; and the data change value of the first texture data is added to the first texture data to obtain updated first texture data. That the conversion parameters are updated based on the gradient corresponding to the conversion parameters may be implemented by the following technical solutions: the set learning rate is multiplied by the gradient corresponding to the conversion parameters to obtain data change values of the conversion parameters; and the data change values of the conversion parameters are added to the conversion parameters to obtain updated conversion parameters.

The process of updating the first texture data based on the rendering loss is similar to a back propagation process of machine learning. The first texture data is inputted into a differentiable rasterization renderer. The fitted rendering image is outputted through forward rendering of the differentiable rasterization renderer. Because there is an error between the output result (the fitted rendering image) of the differentiable rasterization renderer and the standard rendering image, the error between the output result and the standard rendering image is calculated, and back propagation is performed based on the error. Back propagation is implemented based on a gradient descent algorithm. During back propagation, the first texture data and the conversion parameters are adjusted based on the error. For example, a partial derivative of the rendering loss relative to the first texture data is calculated, and a gradient of the rendering loss relative to the first texture data is generated. Because a direction of the gradient indicates a direction in which the error is enlarged, the first texture data is updated by using the gradient descent algorithm. Partial derivatives of the rendering loss relative to the conversion parameters are calculated, and a gradient of the rendering loss relative to the conversion parameters is generated. Because a direction of the gradient indicates a direction in which the error is enlarged, the conversion parameters are updated by using the gradient descent algorithm. The foregoing process is continuously iterated until an iteration ending condition is satisfied.

Step 104: Perform, based on the updated conversion parameters and the updated first texture data, real-time rendering to obtain a target rendering image including the virtual object.

In some embodiments, step 104 of "perform, based on the updated conversion parameters and the updated first texture data, real-time rendering" may be implemented by the following technical solutions: when the rendering loss is less than a loss threshold, real-time rendering is performed based on the updated conversion parameters and the updated first texture data; or when the number of updates reaches a threshold of the number of updates, real-time rendering is performed based on the updated conversion parameters and the updated first texture data.

For example, the iteration ending condition includes at least one of the following conditions: a value of a rendering loss function is less than a loss threshold; and the number of iterations reaches a set number. When the iteration ending condition is satisfied, the updated conversion parameters and the updated first texture data are taken as finally stored rendering basic resources for real-time rendering. When the number of iterations is not defined, the similarity between the target rendering image and the standard rendering image is defined according to a set loss threshold. The smaller the loss threshold is, the more similar the target rendering image is to the standard rendering image. When the loss threshold is not defined, the similarity between the target rendering image and the standard rendering image is defined according to the set number of iterations. The larger the set number of iterations is, the more similar the target rendering image is to the standard rendering image. Whether real-time rendering can be performed based on the current updated first texture data and conversion parameters is determined according to the loss threshold or the number of updates, which can improve the fitting efficiency and prevent waste of fitting resources.

In some embodiments, step 104 of "perform, based on the updated conversion parameters and the updated first texture data, real-time rendering to obtain a target rendering image including the virtual object" may be implemented by the following technical solutions: space conversion is performed, based on the updated conversion parameters, on the updated first texture data toward the second texture data to obtain fourth texture data located in the same dynamic range space as the second texture data; at least one two-dimensional texture coordinate of the virtual object is determined; the following processing is performed on each two-dimensional texture coordinate: a texture image corresponding to the two-dimensional texture coordinate is sampled from the fourth texture data, and the texture image obtained by sampling is mapped; and the target rendering image including the virtual object is generated based on a mapping result of each two-dimensional texture coordinate.

For example, the updated first texture data is stored in the texture image. After the texture image is acquired, in a game, real-time image rendering may be performed based on the texture image, to avoid loading of several textures and save a relevant storage space and computing resources. Accordingly, the rendering efficiency of the virtual object is improved.

For example, the two-dimensional texture coordinates of the virtual object are acquired. The two-dimensional texture coordinates are given in advance or automatically generated. The two-dimensional texture coordinates may be UV2 coordinates. UV2 coordinates define position information of each point in an image. These points are associated with a model, to determine a position of a surface texture map. According to UV coordinates, each point in an image accurately corresponds to the surface of a model object. The fourth texture data is sampled based on UV2, a texture map composed of the sampled fourth texture data is mapped to a basic model of the virtual object, to implement real-time rendering.

According to the embodiments of this application, the first texture data and the second texture data are respectively rendered, and the first texture data and the conversion parameters involved in rendering based on the first texture data are updated based on the loss between the rendering results. The image information range of the second texture data is greater than that of the first texture data, and the data size of the first texture data is smaller than that of the second texture data. Therefore, when real-time image rendering is performed based on the updated first texture data and conversion parameters, a smaller storage space and fewer computing resources are consumed to achieve a rendering effect corresponding to the second texture data. Accordingly, the utilization of a rendering resource is effectively improved.

Next, an exemplary application of the embodiments of this application in an actual application scenario is described.

The embodiments of this application may be applied to rendering scenes of various games such as a battle game, a racing game, and a dress up game. In some embodiments, a server acquires first texture data of a virtual object and conversion parameters corresponding to second texture data of the virtual object. A data size of the first texture data is smaller than a data size of the second texture data, and an image information range of the first texture data is smaller than an image information range of the second texture data. Fitting rendering is performed based on the conversion parameters and the first texture data to obtain a fitted rendering image including the virtual object. A rendering loss between the fitted rendering image and a standard rendering image is determined, and the conversion parameters and the first texture data are updated based on the rendering loss. The standard rendering image is a rendering image that is obtained by performing standard rendering based on the second texture data and that includes the virtual object. The foregoing processing is performed before a game is started. For example, in the development and packaging stage of the game, a terminal receives the updated first texture data and the updated conversion parameters (may be packaged in an installation package) that are transmitted by the server. During installation and operation of the game, the terminal performs, based on the updated conversion parameters and the updated first texture data, real-time rendering on the virtual object to obtain a target rendering image including the virtual object, and performs human-computer interaction, such as a game battle, in a virtual scene based on the target rendering image. The embodiments of this application are applicable to most mobile game applications, especially mobile game applications with high requirements for the rendering performance and rendering effect. The solutions of this application can greatly improve the rendering efficiency, and reduce a difference from an original effect.

Figure 4:
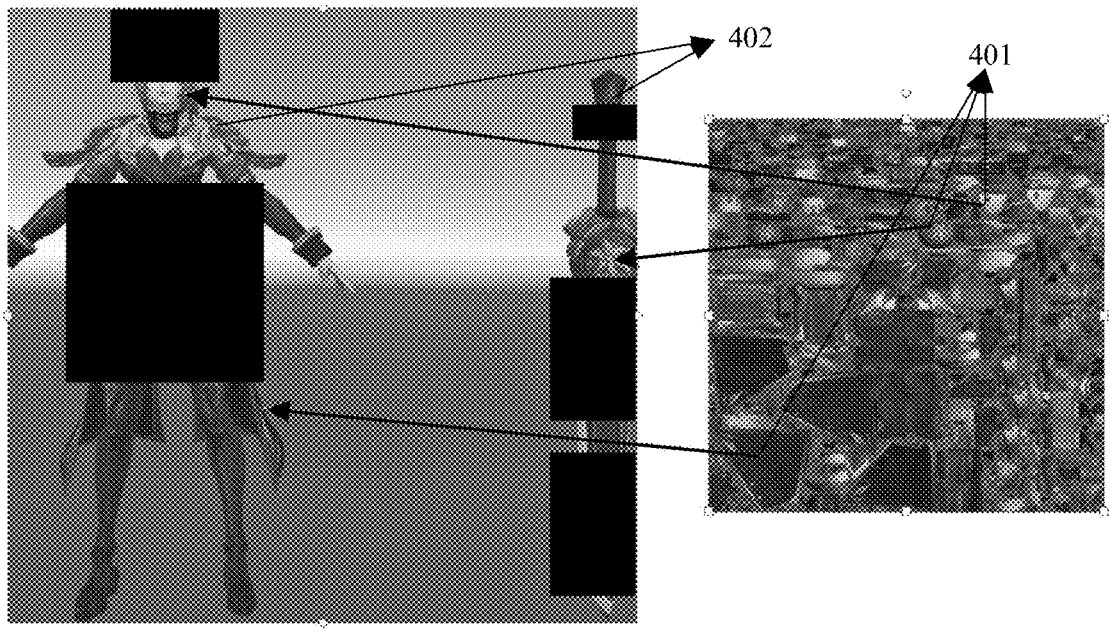
FIG. 4 is a schematic diagram of rendering in an image rendering method according to an embodiment of this application.

Referring to FIG. 4, FIG. 4 is a schematic diagram of rendering according to an embodiment of this application. The rendering effect of the game according to the embodiments of this application requires only a piece of texture and corresponding UV2 vertex data. It can be seen as mapping, based on second texture coordinates (UV2), a fitted texture 401 to a model 402 (that is, a to-be-rendered virtual object).

Figure 5:
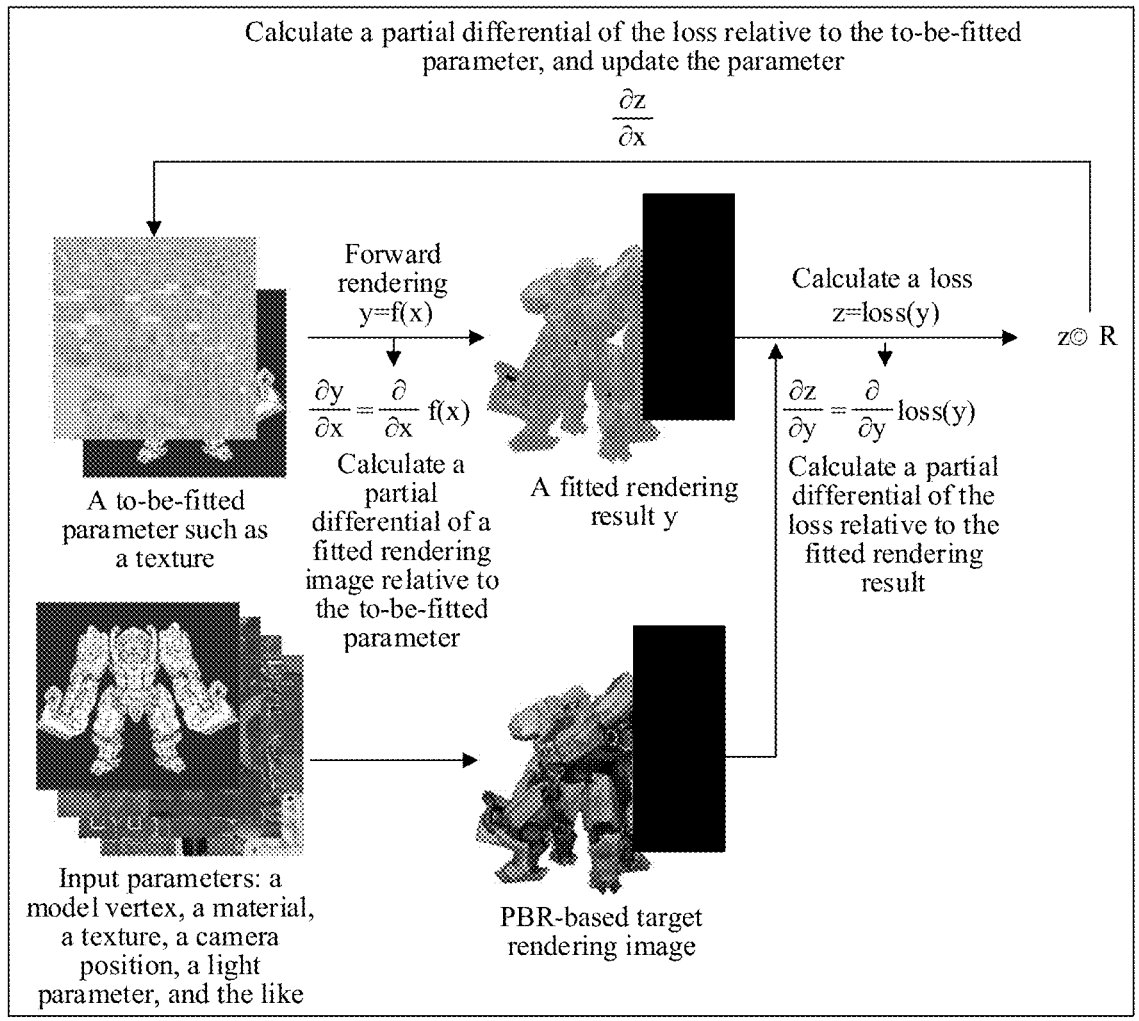
FIG. 5 is a schematic flowchart of fitting rendering in an image rendering method according to an embodiment of this application.

The following specifically describes a differentiable rendering-based computing framework and a machine learning fitting algorithm according to the embodiments of this application. Referring to FIG. 5, FIG. 5 is a schematic flowchart of fitting rendering according to an embodiment of this application. As shown in FIG. 5, a rendering process is a very complex function f, with an input of x. x is a parameter set (to-be-fitted parameters), which includes data such as a model vertex position, a material parameter, and a texture parameter. Y outputted by f is a rendering result.

In the embodiments of this application, data, such as a vertex position, is not optimized. Only first texture data and conversion parameters in x are optimized. The objective is to under the condition of a given HDRR result, calculate x to enable f(x) to approach the HDRR result as much as possible. An approximation is calculated by using a loss function. A partial differential of a fitted rendering image relative to a to-be-fitted parameter is calculated by using the following formula:

$$\frac{\partial y}{\partial x} = \frac{\partial}{\partial x} f(x).$$

A partial differential of the loss function relative to the fitted rendering image is calculated by using the following formula:

$$\frac{\partial z}{\partial y} = \frac{\partial}{\partial y} \text{Loss}(y).$$

A partial differential of the loss function relative to the to-be-fitted parameter is calculated by using the following formula: $\partial z/\partial x'$ A gradient descent algorithm is taken as an optimization algorithm. However, f is a very complex function, and a normal rendering process is not derivable. In order to calculate optimal x by using the gradient descent algorithm, y needs to be derivable. Therefore, an embodiment of this application provides a derivable (that is, differentiable) rasterization rendering framework. f is a complete rasterization rendering process. In order to enable f to be differentiable, the embodiments of this application make improvement on rasterization rendering. Refer to FIG. 8. A whole modified rasterization rendering process is implemented by using the Compute Unified Device Architecture (CUDA), and is operated as a module of a Machine Learning Library (such as PyTorch). The whole rendering process can back-propagate a gradient, so the whole process is differentiable. All relevant assets are subjected to connection with gradients to obtain a compute tangent/normal, generate lightmap UV coordinates, and compute animation and skin. The compute tangent/normal, the lightmap UV coordinates, the animation and skin are subjected to connection with gradients to obtain a clip space position. All the relevant assets are subjected to ordinary connection to obtain triangle index buffers. Rasterization is performed based on the clip space position and the triangle index buffers to obtain coordinates (u, v) ∂u/∂x' ∂u/∂y' ∂v/∂x' and ∂v/∂y' respectively. Interpolation is performed based on the coordinates (u, v) ∂u/∂x' ∂u/∂y' ∂v/∂x' ∂v/∂y' and vertex attributes to obtain interpolated attributes and attribute pixel derivatives. Texture sampling is performed based on the interpolated attributes, attribute pixel derivatives, and a texture to obtain filtered samples. To-be-fitted GroundTruth Shading is performed based on lights camera, material parameters, the interpolated attributes, and filtered samples to obtain an aliased image. Antialiasing is performed on the aliased image to obtain a final image.

The following specifically describes an application principle of an HDR space conversion function in the image rendering method according to the embodiments of this application. In order to reduce package body occupancy and memory usage, finally stored texture data is an LDRT, that is, data with a dynamic range of [0-1]. During rendering, the data will be converted to an HDR space, and rendering is performed based on the converted data. The HDR space has a wider range of data and includes more data that the human visual system can perceive. A function used for conversion is an HDR space conversion function, which can be seen as an inverse process of tone mapping.

Figure 6A:
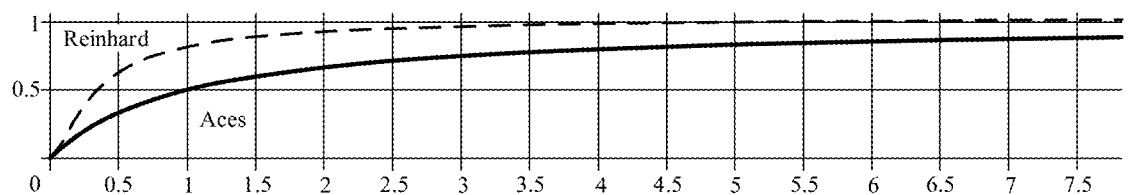
FIG. 6A to FIG. 6E are schematic diagrams of dynamic range conversion in an image rendering method according to embodiments of this application.
Figure 6B:
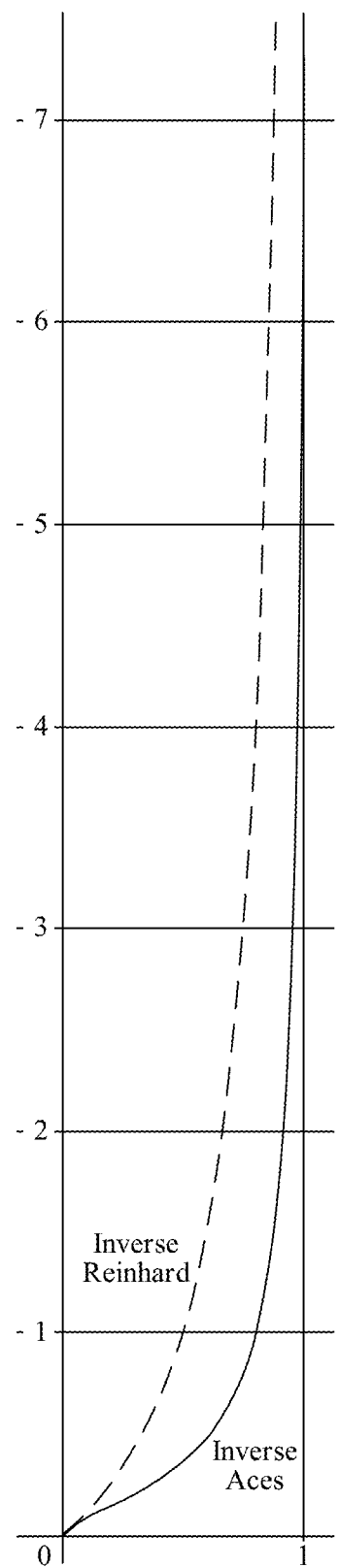

For example, a tone mapping function Reinhard may refer to formula (4), and its function curve is shown as a dotted curve in FIG. 6A:

$$c_L = \frac{c_H}{1.0 + c_H}, \quad (4)$$

where, $c_H$ is a color value of the HDR space, and $c_L$ is a color value of an LDR space. An HDR space conversion function (Inverse Reinhard) corresponding to the tone mapping function may refer to formula (5), and its function curve is shown as a dotted curve in FIG. 6B:

$$c_H = \frac{c_L}{1.0 - c_L}. \quad (5)$$

For example, a tone mapping function Aces may refer to formula (6), and its function curve is shown as a solid curve in FIG. 6A:

$$c_L = \frac{c_H(2.51c_H + 0.03)}{c_H(2.43c_H + 0.59) + 0.14}, \quad (6)$$

where, $c_H$ is an original HDR color value, and $c_L$ is an LDR color value. An HDR space conversion function (Inverse Aces) corresponding to the tone mapping function may refer to formula (7), and its function curve is shown as a solid curve in FIG. 6B:

$$c_H = \frac{0.0062 - 0.1213c_L - 0.0021\sqrt{9 + 13702c_L - 10127c_L^2}}{c_L - 1.03292}. \quad (7)$$

In the embodiments of this application, for different rendering effects of different HDRR, an LDRT needs to be fitted, so that a rendering effect of LDRT-based unlit rendering approaches the rendering effect of HDRR. Different rendering effects have different brightness ranges. All parameters of a single HDR space conversion function are not an optimal solution. Regardless of the HDR space conversion function corresponding to Reinhard or the HDR space conversion function corresponding to Aces, the parameters of the function are constant and cannot be well adapted to different rendering brightness ranges.

Figure 6C:
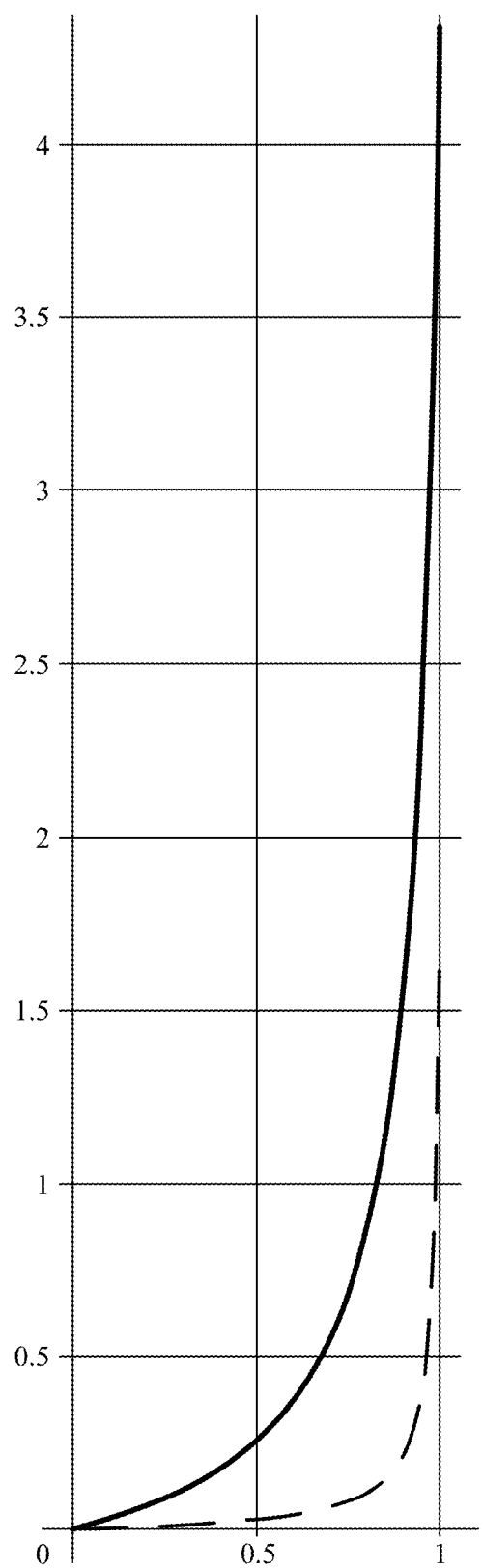
Figure 6D:
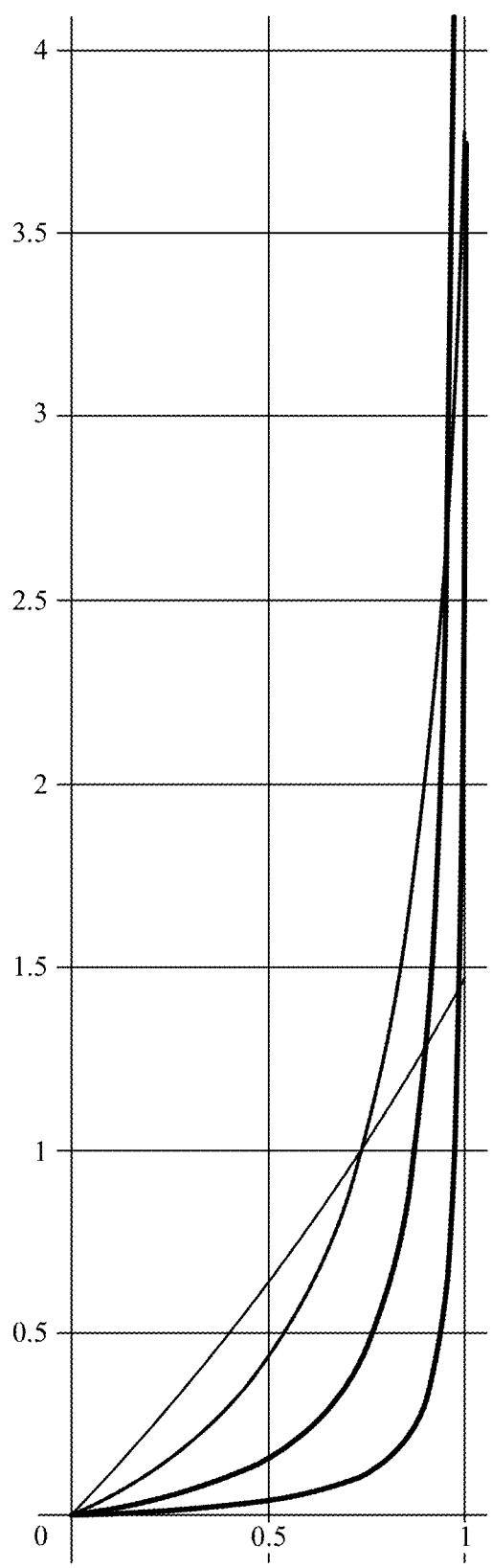
Figure 6E:
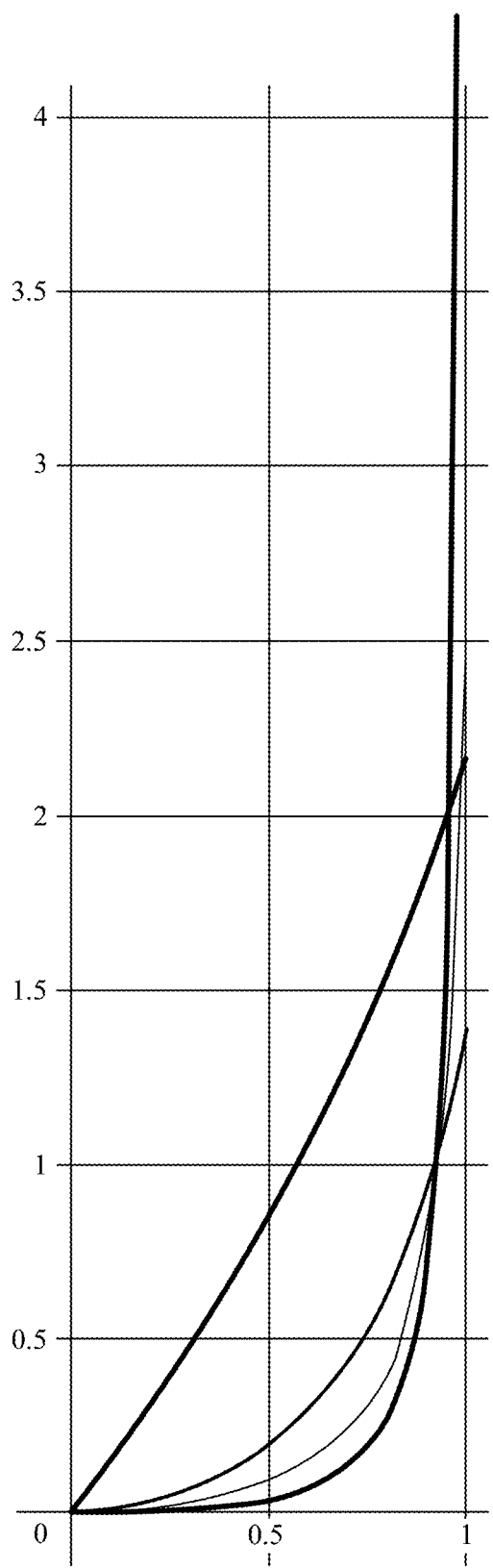
Figure 7A:
FIG. 7A and FIG. 7B are schematic diagrams of rendering in an image rendering method according to embodiments of this application.
Figure 7B:

Referring to FIG. 7A and FIG. 7B, FIG. 7A and FIG. 7B are schematic diagrams of rendering in an image rendering method according to embodiments of this application. A color brightness range of a virtual object in FIG. 7A is more concentrated in a dark part, and a color brightness range of a virtual object in FIG. 7B is more concentrated in a bright part, so ideally curves of HDR space conversion functions for the virtual objects are shown as those in FIG. 6C. The virtual object in FIG. 7A corresponds to a dotted curve shown in FIG. 6C. That is, a wider texture data range is allocated to a darker color space. According to the dotted curve, a texture data range of [0-0.9] is allocated to a brightness interval of [0-0.2]. A smaller texture data range is allocated to a brighter color space. According to the dotted curve, a texture data range of [0.9-1.0] is allocated to a brightness interval of [0.2-1.6]. Furthermore, the maximum brightness is controlled to be about 1.6. Such data allocation can achieve a high precision range and an optimal fitting effect of a region with a dark rendering result. The virtual object in FIG. 7B corresponds to a solid curve shown in FIG. 6C. That is, a wider texture data range is allocated to a brighter color space. According to the solid curve, a texture data range of [0.44-1.0] is allocated to a brightness interval of [0.2-4.34]. A smaller texture data range is allocated to a darker color space. According to the solid curve, a texture data range of [0-0.44] is allocated to a brightness interval of [0-0.2]. Furthermore, the maximum brightness is controlled to be about 4.34. Such data allocation can achieve a high precision range and an optimal fitting effect of a region with a bright rendering result.

It can be seen from the above that in order to achieve an optimal fitting effect, a curve of an HDR space conversion function needs to be customized and needs to be automatically fitted. During implementation of the embodiments of this application, the applicant has been inspired by the formulas of the tone mapping function Reinhard and the tone mapping function Aces, and realized automatic fitting of parameters of the following two forms of HDR space conversion functions. Furthermore, the image rendering method according to the embodiments of this application are not limited to the following forms of HDR space conversion functions, which can be configured individually according to different needs and different game computation overheads of other games.

For example, a first-order tone mapping function is shown as formula (8):

$$c_L = \frac{ac_H + b}{cc_H + d}, \quad (8)$$

where, a, b, c, d are parameters of the first-order tone mapping function, $c_H$ is an original HDR color value, and $c_L$ is an LDR color value.

For example, a first-order HDR space conversion function corresponding to the first-order tone mapping function is shown as formula (9):

$$c_H = \frac{ec_L + f}{gc_L + h}, \qquad (9)$$

where, e, f, g, h are parameters of the first-order HDR space conversion function, $c_H$ is an original HDR color value, and $c_L$ is an LDR color value.

Subsequently, for each rendering effect of HDRR, optimal e, f, g, h parameters will be fitted by using a machine learning fitting algorithm. Furthermore, when $c_L$ is equal to 0, $c_H$ is equal to 0, so the f parameter is always 0. Through simplification, formula (10) can be obtained:

$$c_H = \frac{c_L}{pc_L + q}, \qquad (10)$$

where, p, q are parameters of the first-order HDR space conversion function that need to be fitted, different p, q correspond to different curves, $c_H$ is an original HDR color value, and $c_L$ is an LDR color value. FIG. 6D shows different curves corresponding to different p, q, an abscissa is an original HDR color value, and an ordinate is an LDR color value.

For example, a second-order tone mapping function is shown as formula (11):

$$c_L = \frac{ac_H^2 + bc_H + c}{dc_H^2 + ec_H + f}, \qquad (11)$$

where, a, b, c, d, e, f are parameters of the second-order tone mapping function, $c_H$ is an original HDR color value, and $c_L$ is an LDR color value.

For example, a second-order HDR space conversion function corresponding to the second-order tone mapping function is shown as formula (12):

$$c_H = \frac{-\sqrt{pc_L^2 + qc_L + r} + sc_L + t}{uc_L + v}, \qquad (12)$$

where, p, q, r, s, t, u, v are parameters of the second-order HDR space conversion function, $c_H$ is an original HDR color value, and $c_L$ is an LDR color value.

Subsequently, for each rendering effect of HDRR, optimal p, q, r, s, t, u, v parameters will be fitted by using the machine learning fitting algorithm. In addition, when $c_L$ is equal to 0, $c_H$ is equal to 0, so the u, v parameters are always 0. Through simplification, formula (13) can be obtained:

$$c_H = \frac{-\sqrt{pc_L^2 + qc_L + r} + sc_L + \sqrt{r}}{c_L + t}, \qquad (13)$$

where, p, q, r, s, t are parameters of the second-order HDR space conversion function that need to be fitted, different p, q, r, s, t correspond to different curves, $c_H$ is an original HDR color value, and $c_L$ is an LDR color value. FIG. 6E shows different curves corresponding to different p, q, an abscissa is an original HDR color value, and an ordinate is an LDR color value.

Compared with the first-order HDR space conversion function, the second-order HDR space conversion function can provide more curve shapes and support more compression methods for a brightness range. The amount of computation corresponding to the first-order HDR space conversion function is less than that corresponding to the second-order HDR space conversion function.

The following specifically describes how to use a differentiable rendering framework and a machine learning algorithm to fit optimal conversion parameters and first texture data (an LDRT).

Figure 9:
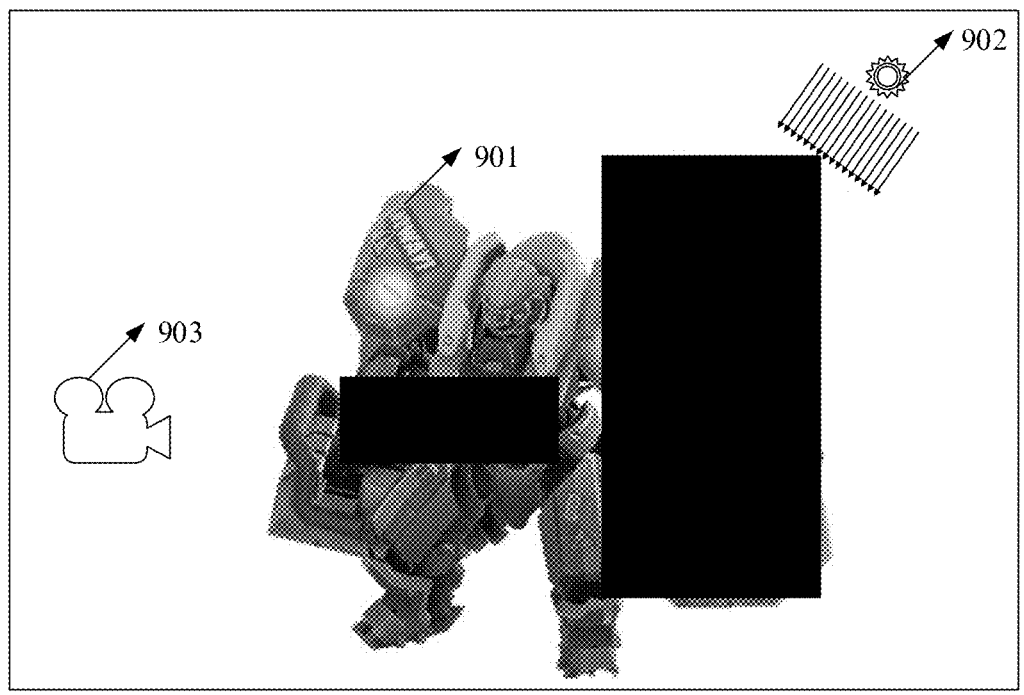
FIG. 9 is a schematic diagram of a scenario of machine learning fitting in an image rendering method according to an embodiment of this application.

As shown in FIG. 9, inputs include: 1) An original virtual object of PBR, including a model 901, a material sphere, and light 902 (may including parallel light, point light or area light); and 2) A camera 903, remaining stationary during fitting.

Figure 10:
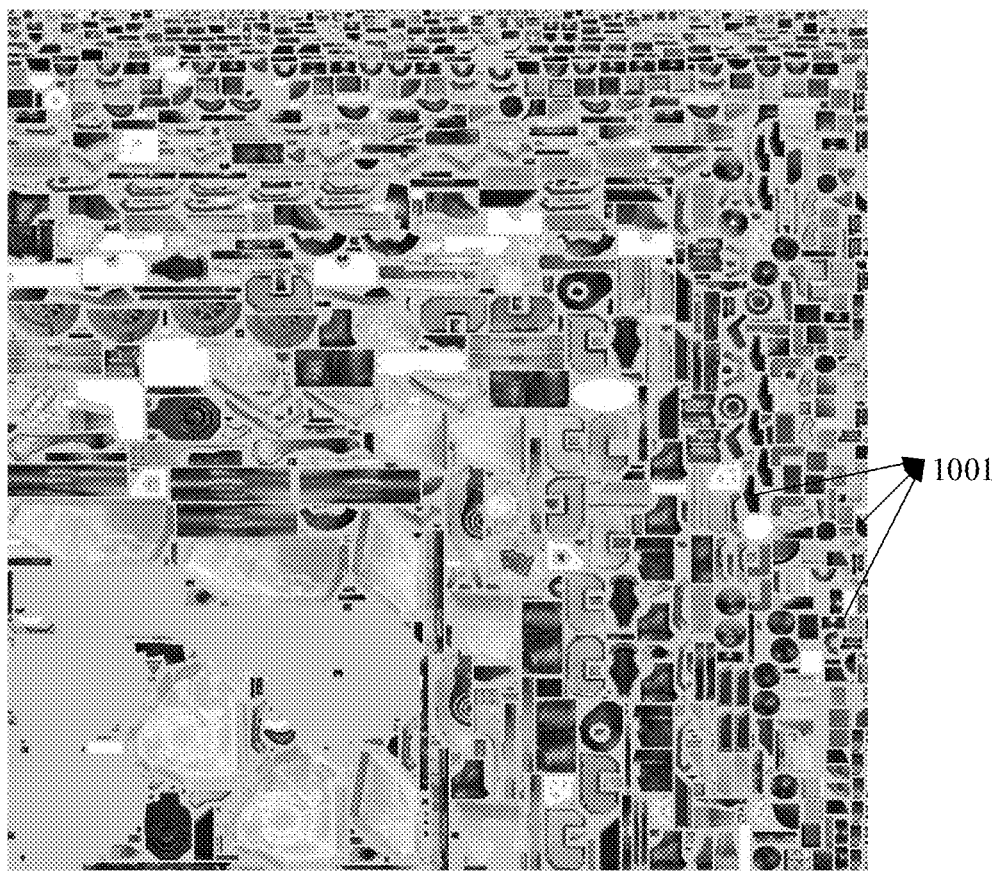
FIG. 10 is a schematic diagram of a fitted texture in an image rendering method according to an embodiment of this application.

Outputs include: 1) Automatically generated model UV2, used for mapping a texture space to a model rendering result; 2) A texture 1001 expanded based on UV2, as shown in FIG. 10, the texture storing baked LDRT data at the end of fitting, and a pixel parameter of the texture being represented by ci in the following description; and 3) Optimal parameters of the HDR space conversion function (inverse tone mapping) that are obtained by fitting.

Figure 11:
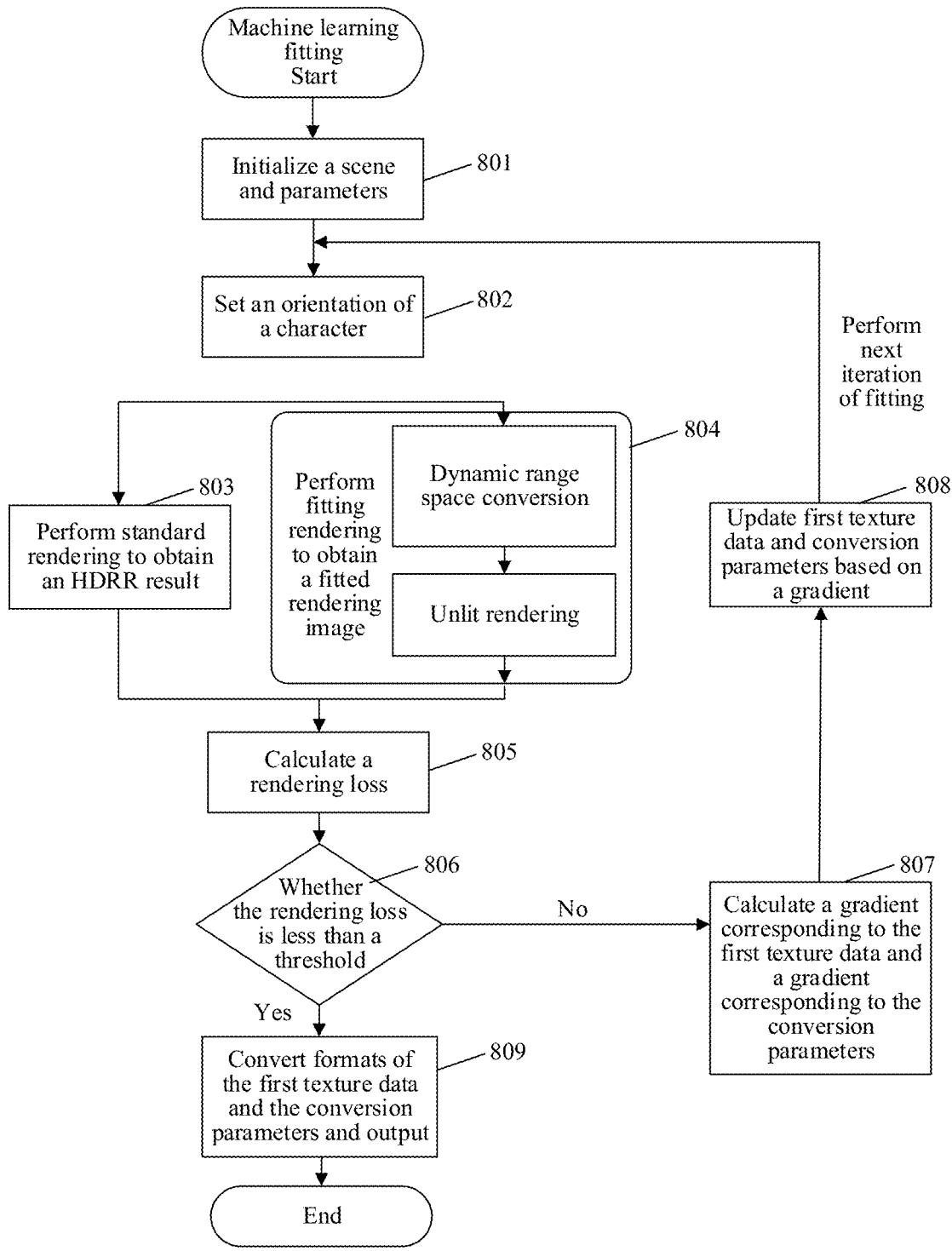
FIG. 11 is a schematic flowchart of machine learning fitting in an image rendering method according to an embodiment of this application.

As shown in FIG. 11, under the conditions of given inputs and outputs, a complete fitting process mainly includes 8 steps, which will be specifically described below.

Step 801: Initialize a scene and parameters.

Figure 12:
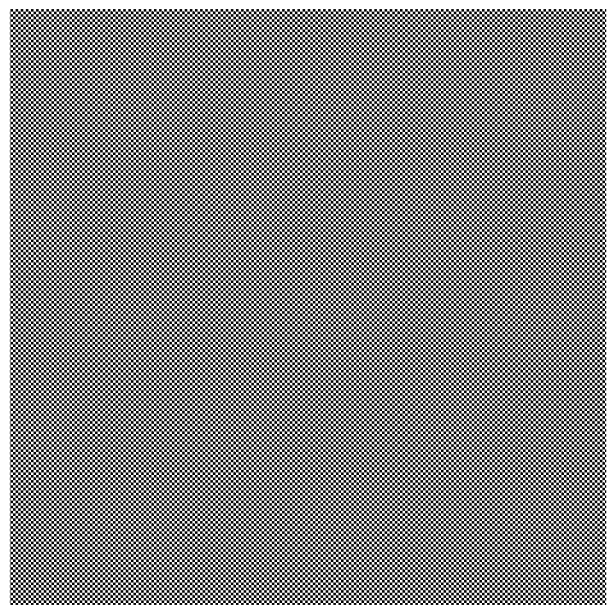
FIG. 12 is a schematic diagram of an initialization value of first texture data in an image rendering method according to an embodiment of this application.

Before machine learning fitting, the scene is initialized first, which includes loading of a model, a texture, a material, and the like. Then, a position and an orientation (not optimized) of a camera are set, a position and an orientation of the model are set, parameters (not optimized) of various lights are set, and model UV2 is automatically generated. In addition, data (first texture data) of each pixel in a texture image and a parameter $\vartheta$ of an HDR space conversion function (inverse tone mapping) need to be initialized. Generally, the parameters may be initialized to gray constants shown in FIG. 12. During machine learning fitting, the position and the orientation of the camera and the parameters of the lights are not optimized.

Step 802: Set an orientation of a character, and specifically, set an orientation of a virtual object (that is, a model) during machine learning fitting.

Figure 13:
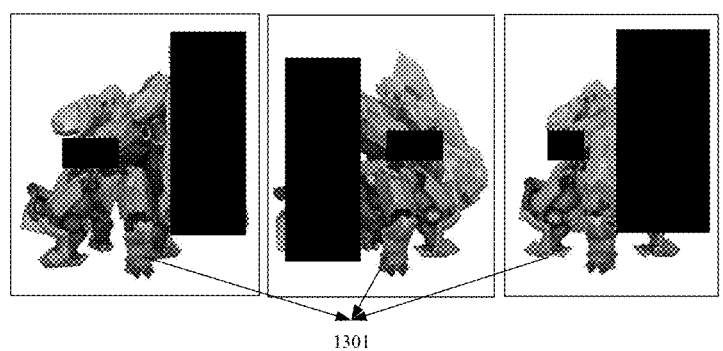
FIG. 13 is a screen space rendering image of a virtual object in an image rendering method according to an embodiment of this application.

During actual operation of a game, a virtual object is not always in the same orientation. Therefore, rendering effects of the character in various orientations need to be fitted, to ensure that the rendering effects of the virtual object in various states are accurate. In an example of orientation setting for the virtual object shown in FIG. 13, a virtual object 1301 may be in three different orientations, and an orientation of the virtual object will be randomly set in each iteration.

Step 803: Perform standard rendering to obtain an HDRR result.

Figure 14:
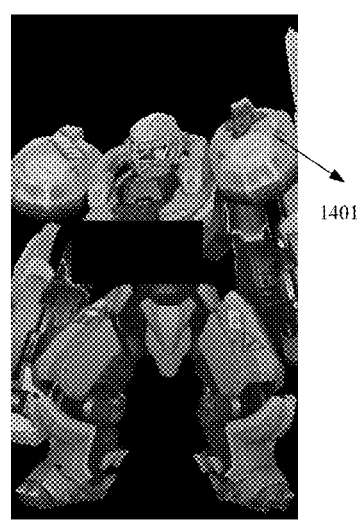
FIG. 14 is a screen space rendering image of a virtual object in an image rendering method according to an embodiment of this application.

The HDRR result is a standard rendering effect that needs to be fitted. First, PBR is performed based on an HDRT to obtain a rendering image (that is, a standard rendering image) of a virtual object 1401 in a certain orientation shown in FIG. 14.

Step 804: Perform fitting rendering to obtain a fitted rendering image including the virtual object.

Figure 15:
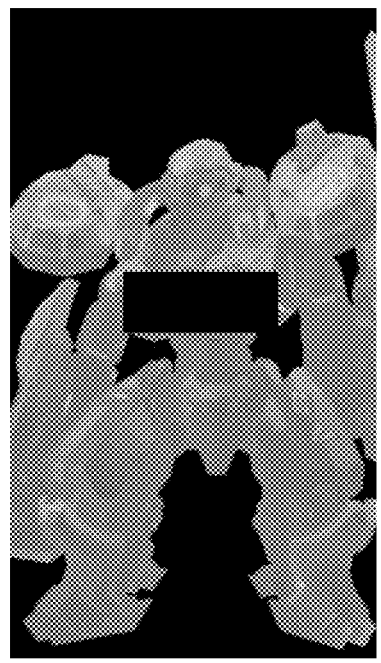
FIG. 15 is a fitted screen space rendering image of a virtual object in an image rendering method according to an embodiment of this application.

Then, rendering is performed by taking the first texture data as a resource and by using an unlit rendering method in the same orientation of the virtual object, to obtain a rendering image (that is, the fitted rendering image) in the same orientation shown in FIG. 15.

Step 805: Calculate a rendering loss.

Figure 16:
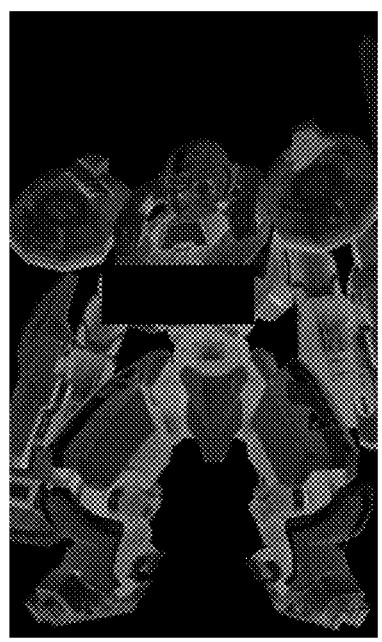
FIG. 16 is a schematic diagram of a pixel value difference between a standard rendering result and a fitted result in a screen space in an image rendering method according to an embodiment of this application.

In order to enable the fitted rendering image to approach the standard rendering image, the fitted texture needs to be modified. First, a difference between the fitted rendering image and the standard rendering image is calculated. FIG. 16 shows a pixel value difference between the two rendering images in a screen space. In the embodiments of this application, an L1 loss function is adopted, which is shown as formula (14):

$$L1(Img1, Img2) = \frac{1}{HW} \sum_{i=1}^{H} \sum_{j=1}^{W} |Img1_{i,j} - Img2_{i,j}|, \quad (14)$$

where, Img1 and Img2 respectively represent the standard rendering image and the fitted rendering image, H and W respectively represent the length and the width of Img1 (or Img2), $$\sum_{i=1}^{H} \sum_{j=1}^{W} |Img1_{i,j} - Img2_{i,j}|$$

represents the pixel value difference between the standard rendering image and the fitted rendering image in the screen space, and (i, j) represents any pixel in the standard rendering image in the screen space.

Step 806: Determine whether the rendering loss is less than a threshold, if yes, perform step 807 and 808, if no, perform step 809.

Step 807: Calculate a gradient corresponding to the first texture data and a gradient corresponding to the conversion parameters.

After the loss is calculated, a gradient of the rendering loss relative to the first texture data and a gradient relative to the conversion parameters may be calculated by using the PyTorch framework and a differentiable rasterization renderer.

Step 808: Respectively update the first texture data and the conversion parameters based on the corresponding gradients, and perform step 802 to step 805.

After the gradient relative to the first texture data is calculated, the first texture data is updated by using an optimizer for PyTorch. After the gradient relative to the conversion parameters is calculated, the conversion parameters are updated by using the optimizer for PyTorch. Then, step 802 is performed for next iteration. An iteration process of step 802 to step 807 is continuously repeated, so that the first texture data and the conversion parameters will gradually converge and approach optimal values.

Step 809: Convert formats of the first texture data and the conversion parameters and output.

When the rendering loss is less than the loss threshold, it indicates that the fitted rendering image is very close to the standard rendering image, that is, the whole iteration process can be ended. The first texture data and the conversion parameters are stored. In a game, the obtained texture image may be sampled based on UV2 to obtain a rendering result close to HDRR.

The following describes step 804 in detail. Step 804 includes 2 sub-steps, and describes how to perform unlit rendering based on the first texture data. First, first texture data in an LDR space is converted to an HDR space by using formula (10) or formula (13). At the beginning of the algorithm, parameters of the formula are default initial values. Subsequently, in each iteration, the parameters (the conversion parameters) of the formula are updated in the previous iteration. During iteration of the algorithm, the parameters are gradually updated based on a gradient to optimal values. Next, texture data in the HDR space that is obtained by sampling based on UV2 texture coordinates is rendered to a world space to obtain a final rendering result in a screen space.

Figure 17:
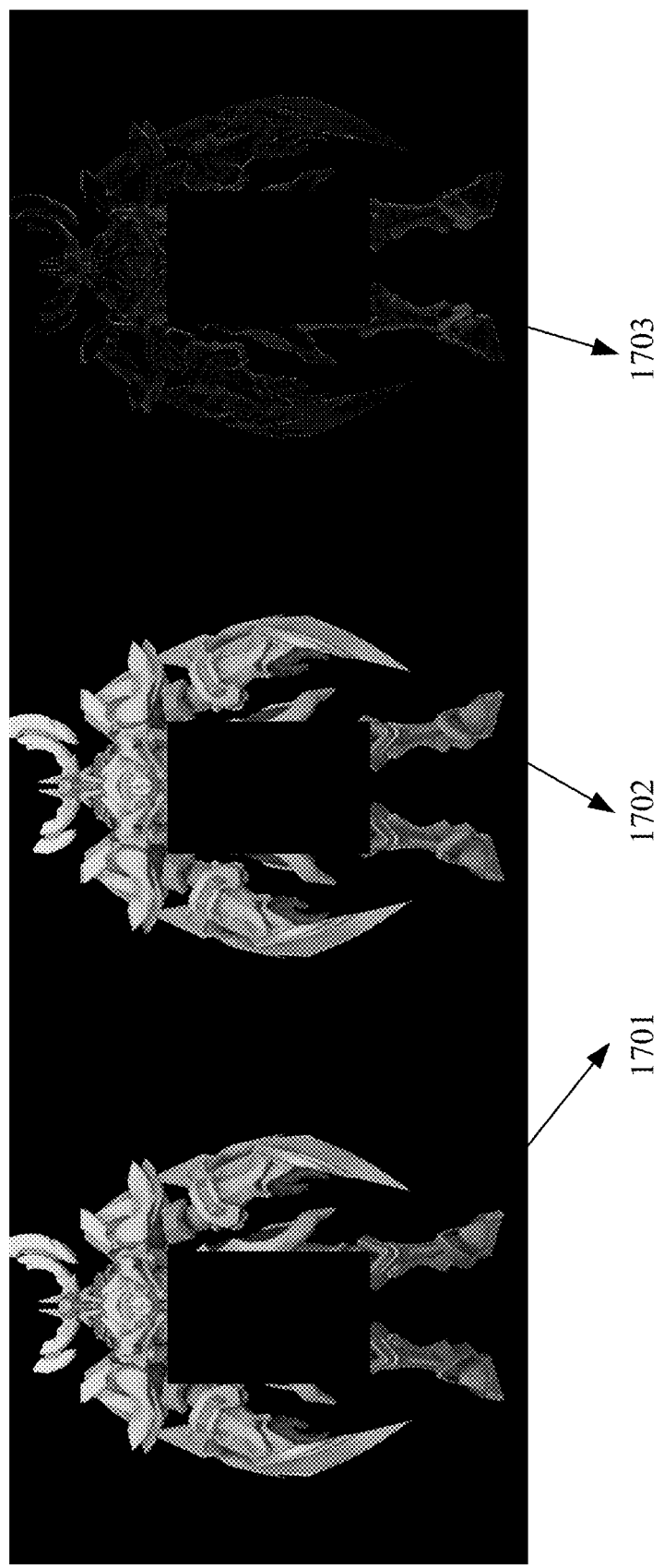
FIG. 17 is a schematic diagram of a loss effect of an image rendering method according to an embodiment of this application.
Figure 18:
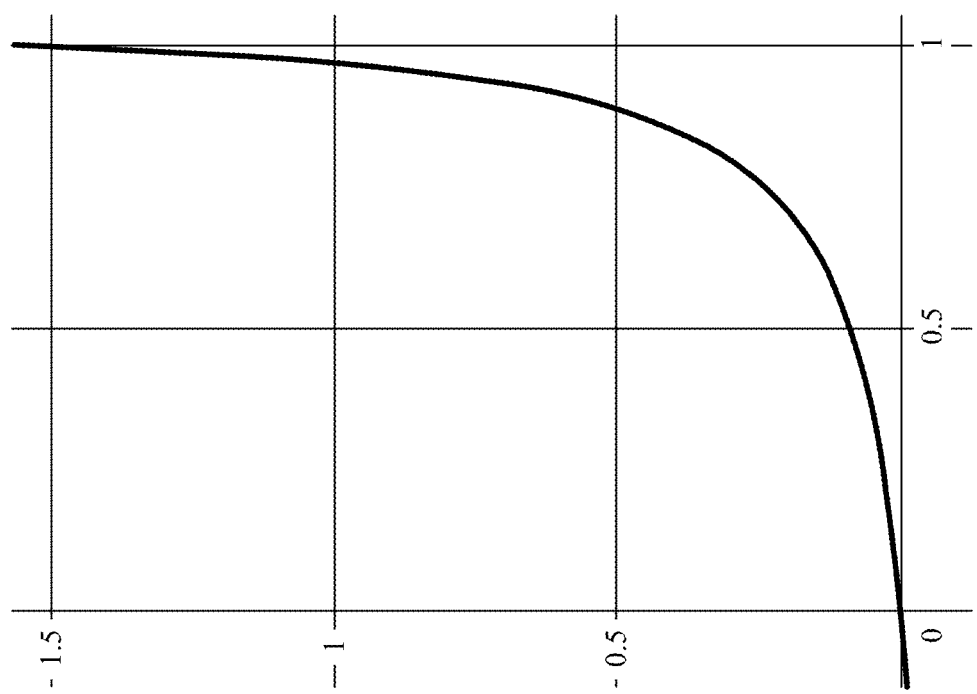
FIG. 18 is a schematic diagram of fitting of a dynamic range space conversion function in an image rendering method according to an embodiment of this application.

Referring to FIG. 17, FIG. 17 is a schematic diagram of a loss effect of an image rendering method according to an embodiment of this application. 1701 is a standard rendering image. 1702 is a target rendering image that is obtained by rendering based on the outputted first texture data in step 808 and a fitted HDR space conversion function. The fitted HDR space conversion function is shown in FIG. 18. Conversion parameters in the HDR space conversion function are outputted in step 808. 1703 is a pixel value difference between the target rendering image and the standard rendering image. It can be seen that the pixel value difference between the two rendering images is small.

An embodiment of this application provides an image rendering method. According to the method, the rendering method, that is, HDRR, can be automatically fitted, and an LDRT can be fitted and taken as a rendering basis instead of an HDRT, which greatly reduces a size of texture data, achieves a rendering effect approaching HDRR with very low overhead, greatly improves the frame rate of a game, and reduces electricity consumption.

It may be understood that relevant data, such as user information, involved in the embodiments of this application requires user permission or consent when the embodiments of this application are applied to a specific product or technology. Furthermore, collection, use, and processing of the relevant data need to comply with relevant laws and regulations and standards of relevant countries and regions.

The following describes an exemplary structure of the image rendering apparatus 455 according to the embodiments of this application that is implemented as software modules. In some embodiments, as shown in FIG. 2, software modules in the image rendering apparatus 455 stored in the memory 450 may include: an acquisition module 4551, configured to acquire first texture data of a virtual object and conversion parameters corresponding to second texture data of the virtual object, a data size of the first texture data being smaller than a data size of the second texture data, and an image information range of the first texture data being smaller than an image information range of the second texture data; a fitting module 4552, configured to perform, based on the conversion parameters and the first texture data, fitting rendering to obtain a fitted rendering image including the virtual object; a loss module 4553, configured to determine a rendering loss between the fitted rendering image and a standard rendering image, and update the conversion parameters and the first texture data based on the rendering loss, the standard rendering image being a rendering image that is obtained by performing standard rendering based on the second texture data and that includes the virtual object; and a rendering module 4554, configured to perform, based on the updated conversion parameters and the updated first texture data, real-time rendering to obtain a target rendering image including the virtual object.

In some embodiments, the fitting module 4552 is further configured to: perform, based on the conversion parameters, space conversion on the first texture data of the virtual object toward the second texture data to obtain third texture data, the third texture data being located in the same dynamic range space as the second texture data, and perform, based on the third texture data, fitting rendering corresponding to the virtual object to obtain the fitted rendering image including the virtual object.

In some embodiments, the first texture data includes a first color value of each texture pixel, the second texture data includes a second color value of each texture pixel, and the conversion parameters include a first first-order parameter and a second first-order parameter. The fitting module 4552 is further configured to: perform the following processing on each texture pixel in the first texture data: determine a first product of the first color value of the texture pixel and the first first-order parameter, determine a first sum of the first product and the second first-order parameter, determine a ratio of the first color value corresponding to the texture pixel to the first sum to be a third color value, located in the same dynamic range space as the second color value, of the texture pixel, and combine third color values of a plurality of texture pixels into the third texture data.

In some embodiments, the first texture data includes a first color value of each texture pixel, the second texture data includes a second color value of each texture pixel, and the conversion parameters include a first second-order parameter, a second second-order parameter, a third second-order parameter, a fourth second-order parameter, and a fifth second-order parameter. The fitting module 4552 is further configured to: perform the following processing on each texture pixel in the first texture data: determine a second product of a square of the first color value of the texture pixel and the first second-order parameter, and a third product of the first color value of the texture pixel and the second second-order parameter, perform summation on the second product, the third product, and the third second-order parameter to obtain a second sum, determine a fourth product of the first color value of the texture pixel and the fourth second-order parameter, perform summation on a square root of the second sum, the fourth product, and a square root of the third second-order parameter to obtain a third sum, determine a fourth sum of the first color value of the texture pixel and the fifth second-order parameter, determine a ratio of the third sum to the fourth sum to be a third color value, located in the same dynamic range space as the second color value, of the texture pixel, and combine third color values of a plurality of texture pixels into the third texture data.

In some embodiments, the third texture data includes a third color value of each texture pixel. The fitting module 4552 is further configured to: acquire two-dimensional texture coordinates of the virtual object, acquire a differentiable rendering framework corresponding to fitting rendering, and perform forward propagation on the two-dimensional texture coordinates and the third color value of each texture pixel in the differentiable rendering framework to obtain the fitted rendering image including the virtual object.

In some embodiments, the loss module 4553 is further configured to: determine an overall pixel value difference between the standard rendering image and the fitted rendering image in a screen space, and determine the rendering loss based on the overall pixel value difference, a length of the fitted rendering image, and a width of the fitted rendering image.

In some embodiments, the loss module 4553 is further configured to: perform the following processing on any identical pixel of the fitted rendering image and the standard rendering image in the screen space: determine a first pixel value corresponding to the pixel in the fitted rendering image, and determine a second pixel value corresponding to the pixel in the standard rendering image, take an absolute value of a difference between the first pixel value and the second pixel value as a pixel value difference of the pixel, and perform summation on pixel value differences of a plurality of pixels in the screen space to obtain the overall pixel value difference.

In some embodiments, the loss module 4553 is further configured to: perform, based on the rendering loss, partial derivative processing on the first texture data to obtain a gradient corresponding to the first texture data, perform, based on the rendering loss, partial derivative processing on the conversion parameters to obtain a gradient corresponding to the conversion parameters, and update the first texture data based on the gradient corresponding to the first texture data, and update the conversion parameters based on the gradient corresponding to the conversion parameters.

In some embodiments, the loss module 4553 is further configured to: multiply a set learning rate by the gradient corresponding to the first texture data to obtain a data change value of the first texture data, add the data change value of the first texture data to the first texture data to obtain updated first texture data, multiply the set learning rate by the gradient corresponding to the conversion parameters to obtain data change values of the conversion parameters, and add the data change values of the conversion parameters to the conversion parameters to obtain updated conversion parameters.

In some embodiments, the rendering module 4554 is further configured to: perform, when the rendering loss is less than a loss threshold, real-time rendering based on the updated conversion parameters and the updated first texture data, or perform, when the number of updates reaches a threshold of the number of updates, real-time rendering based on the updated conversion parameters and the updated first texture data.

In some embodiments, the rendering module 4554 is further configured to: perform, based on the updated conversion parameters, space conversion on the updated first texture data toward the second texture data to obtain fourth texture data, the fourth texture data being located in the same dynamic range space as the second texture data, determine at least one two-dimensional texture coordinate of the virtual object, perform the following processing on each two-dimensional texture coordinate: sample, from the fourth texture data, a texture image corresponding to the two-dimensional texture coordinate, and map the texture image obtained by sampling, and generate, based on a mapping result of each two-dimensional texture coordinate, the target rendering image including the virtual object.

An embodiment of this application provides a computer program product or computer program, which includes computer instructions. The computer instructions are stored in a computer-readable storage medium. A processor of a computer device reads the computer instructions from the computer-readable storage medium and executes the computer instructions, and the computer device is enabled to perform the foregoing image rendering method according to the embodiments of this application.

An embodiment of this application provides a non-transitory computer-readable storage medium storing executable instructions that, when executed by a processor, cause the process to implement the image rendering method according to the embodiments of this application, such as the image rendering method shown in FIG. 3A to FIG. 3C.

In some embodiments, the computer-readable storage medium may be a memory such as a ferroelectric random-access memory (FRAM), a read-only memory (ROM), a programmable read-only memory (PROM), an erasable programmable read-only memory (EPROM), an electrically erasable programmable read-only memory (EEPROM), a flash memory, a magnetic surface memory, a compact disc or a compact disc read-only memory (CD-ROM), or may be any device including one or any combination of the foregoing memories.

In some embodiments, the executable instructions may be in the form of a program, software, a software module, a script or code that is written in any form of programming language (including a compiled or interpreted language, or a declarative or procedural language). Furthermore, the executable instructions may be deployed in any form, including being deployed as a stand-alone program or as a module, component, subroutine or another unit suitable for use in a computing environment.

For example, the executable instructions may, but do not necessarily, correspond to files in a file system, and may be stored as part of files that hold other programs or data, for example, stored in one or more scripts in a HyperText Markup Language (HTML) document. or stored in a single file dedicated to the program in question, or stored in multiple collaborative files (such as a file that stores one or more modules, subprograms or code parts). In this application, the term "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each module can be implemented using one or more processors (or processors and memory). Likewise, a processor (or processors and memory) can be used to implement one or more modules. Moreover, each module can be part of an overall module that includes the functionalities of the module.

For example, the executable instructions may be deployed on an electronic device for execution, or on a plurality of electronic devices located at the same site for execution, or on a plurality of electronic devices that are distributed at multiple sites and interconnected through a communication network for execution.

In conclusion, according to the embodiments of this application, the first texture data and the second texture data are respectively rendered, and the first texture data and the conversion parameters involved in rendering based on the first texture data are updated based on the loss between the rendering results. The image information range of the second texture data is greater than that of the first texture data, and the data size of the first texture data is smaller than that of the second texture data. Therefore, when real-time image rendering is performed based on the updated first texture data and conversion parameters, a smaller storage space and fewer computing resources are consumed to achieve a rendering effect corresponding to the second texture data. Accordingly, the utilization of a rendering resource is effectively improved.

The foregoing descriptions are merely the embodiments of this application and are not intended to limit the scope of protection of this application. Any modification, equivalent replacement, improvement or the like made without departing from the spirit and scope of this application shall fall within the scope of protection of this application.

What is claimed is:

1. An image rendering method performed by an electronic device and the method comprising:
    acquiring, by the electronic device, first texture data of a virtual object and conversion parameters corresponding to second texture data of the virtual object;
    performing, by the electronic device, based on the conversion parameters and the first texture data, fitting rendering to obtain a fitted rendering image comprising the virtual object;
    updating, by the electronic device, the conversion parameters and the first texture data based on a rendering loss between the fitted rendering image and a reference rendering image comprising the virtual object, wherein the reference rendering image is a rendering image that is obtained by performing rendering based on the second texture data; and
    performing, by the electronic device, based on the updated conversion parameters and the updated first texture data, real-time rendering to obtain a target rendering image comprising the virtual object.

2. The method according to claim 1, wherein the performing, by the electronic device, based on the conversion parameters and the first texture data, fitting rendering to obtain a fitted rendering image comprising the virtual object comprises:
    performing, by the electronic device, based on the conversion parameters, space conversion on the first texture data of the virtual object toward the second texture data to obtain third texture data, wherein the third texture data is located in a same dynamic range space as the second texture data; and
    performing, by the electronic device, based on the third texture data, fitting rendering to obtain the fitted rendering image comprising the virtual object.

3. The method according to claim 2, wherein the third texture data comprises a third color value of each texture pixel; and
    the performing, by the electronic device, based on the third texture data, fitting rendering corresponding to the virtual object to obtain the fitted rendering image comprising the virtual object comprises:
    acquiring, by the electronic device, two-dimensional texture coordinates of the virtual object;
    acquiring, by the electronic device, a differentiable rendering framework corresponding to fitting rendering; and
    performing, by the electronic device, forward propagation on the two-dimensional texture coordinates and the third color value of each texture pixel in the differentiable rendering framework to obtain the fitted rendering image comprising the virtual object.

4. The method according to claim 1, wherein the rendering loss between the fitted rendering image and the reference rendering image is defined by:
    determining, by the electronic device, an overall pixel value difference between a standard rendering image and the fitted rendering image in a screen space; and
    determining, by the electronic device, the rendering loss based on the overall pixel value difference, a length of the fitted rendering image, and a width of the fitted rendering image.

5. The method according to claim 1, wherein the updating, by the electronic device, the conversion parameters and the first texture data based on the rendering loss comprises:

performing, by the electronic device, based on the rendering loss, partial derivative processing on the first texture data to obtain a gradient corresponding to the first texture data;
performing, by the electronic device, based on the rendering loss, partial derivative processing on the conversion parameters to obtain a gradient corresponding to the conversion parameters; and
updating, by the electronic device, the first texture data based on the gradient corresponding to the first texture data, and updating the conversion parameters based on the gradient corresponding to the conversion parameters.

6. The method according to claim 1, wherein the performing, by the electronic device, based on the updated conversion parameters and the updated first texture data, real-time rendering on the virtual object comprises:
performing, by the electronic device, when the rendering loss is less than a loss threshold, real-time rendering on the virtual object based on the updated conversion parameters and the updated first texture data; and
performing, by the electronic device, when a number of updates of the conversion parameters and the first texture data reaches a threshold of the number of updates, real-time rendering on the virtual object based on the updated conversion parameters and the updated first texture data.

7. The method according to claim 1, wherein the performing, by the electronic device, based on the updated conversion parameters and the updated first texture data, real-time rendering on the virtual object to obtain a target rendering image comprising the virtual object comprises:
performing, by the electronic device, based on the updated conversion parameters, space conversion on the updated first texture data toward the second texture data to obtain fourth texture data, wherein the fourth texture data is located in the same dynamic range space as the second texture data;
determining, by the electronic device, at least one two-dimensional texture coordinate of the virtual object;
sampling, by the electronic device, from the fourth texture data, a texture image corresponding to the two-dimensional texture coordinate, and mapping the texture image obtained by sampling; and
generating, by the electronic device, based on a mapping result of each two-dimensional texture coordinate, the target rendering image comprising the virtual object.

8. The method according to claim 1, wherein a data size of the first texture data is smaller than a data size of the second texture data.

9. The method according to claim 1, wherein an image information range of the first texture data being smaller than an image information range of the second texture data.

10. An electronic device, comprising:
a memory, configured to store computer-executable instructions; and
a processor, configured to, when executing the computer-executable instructions stored in the memory, cause the electronic device to implement an image rendering method including:
acquiring, by the electronic device, first texture data of a virtual object and conversion parameters corresponding to second texture data of the virtual object;
performing, by the electronic device, based on the conversion parameters and the first texture data, fitting rendering to obtain a fitted rendering image comprising the virtual object;
updating, by the electronic device, the conversion parameters and the first texture data based on a rendering loss between the fitted rendering image and a reference rendering image comprising the virtual object, wherein the reference rendering image is a rendering image that is obtained by performing rendering based on the second texture data; and
performing, by the electronic device, based on the updated conversion parameters and the updated first texture data, real-time rendering to obtain a target rendering image comprising the virtual object.

11. The electronic device according to claim 10, wherein the performing, by the electronic device, based on the conversion parameters and the first texture data, fitting rendering to obtain a fitted rendering image comprising the virtual object comprises:
performing, by the electronic device, based on the conversion parameters, space conversion on the first texture data of the virtual object toward the second texture data to obtain third texture data, wherein the third texture data is located in a same dynamic range space as the second texture data; and
performing, by the electronic device, based on the third texture data, fitting rendering to obtain the fitted rendering image comprising the virtual object.

12. The electronic device according to claim 11, wherein the third texture data comprises a third color value of each texture pixel; and
the performing, by the electronic device, based on the third texture data, fitting rendering corresponding to the virtual object to obtain the fitted rendering image comprising the virtual object comprises:
acquiring, by the electronic device, two-dimensional texture coordinates of the virtual object;
acquiring, by the electronic device, a differentiable rendering framework corresponding to fitting rendering; and
performing, by the electronic device, forward propagation on the two-dimensional texture coordinates and the third color value of each texture pixel in the differentiable rendering framework to obtain the fitted rendering image comprising the virtual object.

13. The electronic device according to claim 10, wherein the rendering loss between the fitted rendering image and the reference rendering image is defined by:
determining, by the electronic device, an overall pixel value difference between a standard rendering image and the fitted rendering image in a screen space; and
determining, by the electronic device, the rendering loss based on the overall pixel value difference, a length of the fitted rendering image, and a width of the fitted rendering image.

14. The electronic device according to claim 10, wherein the updating, by the electronic device, the conversion parameters and the first texture data based on the rendering loss comprises:
performing, by the electronic device, based on the rendering loss, partial derivative processing on the first texture data to obtain a gradient corresponding to the first texture data;
performing, by the electronic device, based on the rendering loss, partial derivative processing on the conversion parameters to obtain a gradient corresponding to the conversion parameters; and
updating, by the electronic device, the first texture data based on the gradient corresponding to the first texture data, and updating the conversion parameters based on the gradient corresponding to the conversion parameters.

15. The electronic device according to claim 10, wherein the performing, by the electronic device, based on the updated conversion parameters and the updated first texture data, real-time rendering on the virtual object comprises:
   performing, by the electronic device, when the rendering loss is less than a loss threshold, real-time rendering on the virtual object based on the updated conversion parameters and the updated first texture data; and
   performing, by the electronic device, when a number of updates of the conversion parameters and the first texture data reaches a threshold of the number of updates, real-time rendering on the virtual object based on the updated conversion parameters and the updated first texture data.

16. The electronic device according to claim 10, wherein the performing, by the electronic device, based on the updated conversion parameters and the updated first texture data, real-time rendering on the virtual object to obtain a target rendering image comprising the virtual object comprises:
   performing, by the electronic device, based on the updated conversion parameters, space conversion on the updated first texture data toward the second texture data to obtain fourth texture data, wherein the fourth texture data is located in the same dynamic range space as the second texture data;
   determining, by the electronic device, at least one two-dimensional texture coordinate of the virtual object;
   sampling, by the electronic device, from the fourth texture data, a texture image corresponding to the two-dimensional texture coordinate, and mapping the texture image obtained by sampling; and
   generating, by the electronic device, based on a mapping result of each two-dimensional texture coordinate, the target rendering image comprising the virtual object.

17. The electronic device according to claim 10, wherein a data size of the first texture data is smaller than a data size of the second texture data.

18. The electronic device according to claim 10, wherein an image information range of the first texture data being smaller than an image information range of the second texture data.

19. A non-transitory computer-readable storage medium, storing computer-executable instructions that, when executed by a processor of an electronic device, causes the electronic device to implement an image rendering method including:
   acquiring, by the electronic device, first texture data of a virtual object and conversion parameters corresponding to second texture data of the virtual object;
   performing, by the electronic device, based on the conversion parameters and the first texture data, fitting rendering to obtain a fitted rendering image comprising the virtual object;
   updating, by the electronic device, the conversion parameters and the first texture data based on a rendering loss between the fitted rendering image and a reference rendering image comprising the virtual object, wherein the reference rendering image is a rendering image that is obtained by performing rendering based on the second texture data; and
   performing, by the electronic device, based on the updated conversion parameters and the updated first texture data, real-time rendering to obtain a target rendering image comprising the virtual object.

20. The non-transitory computer-readable storage medium according to claim 19, wherein the performing, by the electronic device, based on the conversion parameters and the first texture data, fitting rendering to obtain a fitted rendering image comprising the virtual object comprises:
   performing, by the electronic device, based on the conversion parameters, space conversion on the first texture data of the virtual object toward the second texture data to obtain third texture data, wherein the third texture data is located in a same dynamic range space as the second texture data; and
   performing, by the electronic device, based on the third texture data, fitting rendering to obtain the fitted rendering image comprising the virtual object.

* * * * *